United States Patent
Cui et al.

(10) Patent No.: US 12,047,613 B2
(45) Date of Patent: Jul. 23, 2024

(54) ADAPTIVE IMAGE ENHANCEMENT USING INTER-CHANNEL CORRELATION INFORMATION

(71) Applicant: HUAWEI TECHNOLOGIES CO., LTD., Shenzhen (CN)

(72) Inventors: Kai Cui, Munich (DE); Atanas Boev, Munich (DE); Elena Alexandrovna Alshina, Munich (DE); Eckehard Steinbach, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/064,745

(22) Filed: Dec. 12, 2022

(65) Prior Publication Data
US 2023/0116285 A1 Apr. 13, 2023

Related U.S. Application Data

(63) Continuation of application No. PCT/EP2021/060211, filed on Apr. 20, 2021.

(30) Foreign Application Priority Data

Jun. 10, 2020 (WO) ............... PCT/EP2020/066048

(51) Int. Cl.
*H04N 19/88* (2014.01)
*H04N 19/136* (2014.01)
(Continued)

(52) U.S. Cl.
CPC ........... *H04N 19/88* (2014.11); *H04N 19/136* (2014.11); *H04N 19/167* (2014.11); *H04N 19/17* (2014.11);
(Continued)

(58) Field of Classification Search
CPC .. H04N 19/117; H04N 19/136; H04N 19/167; H04N 19/17; H04N 19/186; H04N 19/436; H04N 19/85; H04N 19/88
See application file for complete search history.

(56) References Cited

U.S. PATENT DOCUMENTS

| | | |
|---|---|---|
| 8,837,825 B2 | 9/2014 | Su et al. |
| 9,648,332 B2 | 5/2017 | Kim et al. |

(Continued)

FOREIGN PATENT DOCUMENTS

| | | |
|---|---|---|
| JP | 2012034036 A | 2/2012 |
| JP | 2019146218 A | 8/2019 |

(Continued)

OTHER PUBLICATIONS

Kai Cui, Eckehard Steinbach; "Decoder Side Image Quality Enhancement exploiting Inter-channel Correlation in a 3-stage CNN": Submission to CLIC 2018; https://openaccess.thecvf.com/content_cvpr_2018_workshops/papers/w50/Cui_Decoder_Side_Image_CVPR_2018_paper.pdf.*

(Continued)

*Primary Examiner* — Mohammed S Rahaman
(74) *Attorney, Agent, or Firm* — Leydig, Voit & Mayer, Ltd.

(57) ABSTRACT

The present disclosure relates to image modification such as an image enhancement. The image enhancement may be applied for any image modification and it may be applied during or after image encoding and/or decoding, e.g. as a loop filter or a post filter. In particular, the image modification includes a multi-channel processing in which a primary channel is processed separately and secondary channels are processed based on the processed primary channel. The processing is based on a neural network. In order to enhance the image modification performance, prior to applying the modification, the image channels are analyzed and a primary (Continued)

channel and the secondary channels are determined, which may vary for multiples of images, images or image areas.

17 Claims, 17 Drawing Sheets

(51) Int. Cl.
    *H04N 19/167*    (2014.01)
    *H04N 19/17*    (2014.01)
    *H04N 19/186*    (2014.01)
    *H04N 19/436*    (2014.01)

(52) U.S. Cl.
    CPC ......... *H04N 19/186* (2014.11); *H04N 19/436* (2014.11)

(56) References Cited

U.S. PATENT DOCUMENTS

| | | |
|---|---|---|
| 10,237,552 B2 | 3/2019 | Su et al. |
| 2011/0013700 A1* | 1/2011 | Kim ............... H04N 19/176 375/240.18 |
| 2019/0273948 A1 | 9/2019 | Yin et al. |
| 2020/0389672 A1 | 12/2020 | Kennett et al. |
| 2021/0112261 A1* | 4/2021 | Hwang ............... H04N 19/59 |
| 2021/0136395 A1* | 5/2021 | Jun ............... H04N 19/82 |
| 2022/0021905 A1* | 1/2022 | Ma ............... H04N 19/80 |

FOREIGN PATENT DOCUMENTS

| | | |
|---|---|---|
| WO | 2019072097 A1 | 4/2019 |
| WO | 2020048997 A1 | 3/2020 |
| WO | 2020049567 A1 | 3/2020 |

OTHER PUBLICATIONS

Cui et al., "Decoder Side Image Quality Enhancement exploiting Inter-channel Correlation in a 3-stage CNN: Submission to CUC 2018," Proceedings of the IEEE/CVF Conference on Computer Vision and Pattern Recognition (CVPR) Workshops, XP055819365, Total 4 pages (Jun. 2018).

Dong et al., "Compression Artifacts Reduction by a Deep Convolutional Network," arXiv: 1504.06993v1 [cs.CV], Total 9 pages (Apr. 27, 2015).

Cui et al., "Decoder Side Color Image Quality Enhancement using a Wavelet Transform based 3-stage Convolutional Neural Network," Proceedings of the IEEE/CVF Conference on Computer Vision and Pattern Recognition (CVPR) Workshops, XP055819561, Total 6 pages (Jun. 2019).

Zheng et al., "Implicit Dual-domain Convolutional Network for Robust Color Image Compression Artifact Reduction," IEEE Transactions on Circuits and Systems for Video Technology, Total 13 pages, Institute of Electrical Electronics Engineers, New York, New York (Oct. 2018).

Zhang et al., "Beyond a Gaussian Denoiser: Residual Learning of Deep CNN for Image Denoising," IEEE Transactions on Image Processing, vol. 26, No. 7, Total 14 pages, Institute of Electrical Electronics Engineers, New York, New York (Jul. 2017).

Chen et al., "DPW-SDNet: Dual Pixel-Wavelet Domain Deep CNNs for Soft Decoding of JPEG-Compressed Images," CVPR Workshops, Total 10 pages (May 2018).

Cui et al., "Decoder Side Color Image Quality Enhancement using a Wavelet Transform based 3-stage Convolutional Neural Network," The IEEE Conference on Computer Vision and Pattern Recognition (CVPR) Workshops, Total 6 pages, Institute of Electrical Electronics Engineers, New York, New York (Jun. 2019).

Cui et al., "Decoder Side Image Quality Enhancement exploiting Inter-channel Correlation in a 3-stage CNN: Submission to CLIC 2018," The IEEE Conference on Computer Vision and Pattern Recognition (CVPR) Workshops, Total 4 pages, Institute of Electrical Electronics Engineers, New York, New York (Jun. 2019).

Lui et al., "Multi-level Wavelet-CNN for Image Restoration," CVPR Ntire Workshop, Total 10 pages (May 2018).

Kim et al., "Single Image Enhancement Using Inter-channel Correlation," IEEK Transactions on Smart Processing and Computing, vol. 2, No. 3, Total 10 pages (Jun. 2013).

"Series H: Audiovisual and Multimedia Systems, Infrastructure of audiovisual services—Coding of moving video, Advanced video coding for generic audiovisual services," Telecommunication Standardization Sector of ITU, ITU-T H.264, Total 836 pages, International Union of Telecommunications, Geneva, Switzerland (Jun. 2019).

"Series H: Audiovisual and Multimedia Systems, Infrastructure of audiovisual services—Coding of moving video, High efficiency video coding," Telecommunication Standardization Sector of ITU, ITU-T H.265, Total 712 pages, International Union of Telecommunications, Geneva, Switzerland (Nov. 2019).

\* cited by examiner

ADAPTIVE IMAGE ENHANCEMENT USING INTER-CHANNEL CORRELATION INFORMATION

CROSS-REFERENCE TO RELATED APPLICATIONS

This application is a continuation of International Application No. PCT/EP2021/060211, filed on Apr. 20, 2021, which claims priority to International Application No. PCT/EP2020/066048, filed on Jun. 10, 2020. The disclosures of the aforementioned applications are hereby incorporated by reference in their entireties.

TECHINICAL FIELD

Embodiments of the present disclosure generally relate to the field of image or video processing and in particular to image or video modification.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunication networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

In general, image compression may be lossless or lossy. In lossless image compression, the original image can be perfectly reconstructed from the compressed image. However, the compression rates are rather low. In contrast, lossy image compression allows high compression rates with downside of not being able to perfectly reconstruct the original image. Especially when used at low bit rates, lossy image compression introduces visible spatial compression artifacts.

SUMMARY

The present disclosure relates to methods and apparatuses for modifying, e.g. enhancing. an image or a video.

The disclosure is defined by the scope of independent claims. Some of the advantageous embodiments are provided in the dependent claims.

In particular, embodiments of the present disclosure provide an approach for modifying an image which is based on a neural network system processing multiple image channels. A primary channel is processed individually. Secondary channels(s) are processed taking into account the processed primary channel. Prior to the processing by the neural network system, it is selected which image channel is the primary channel.

According to an aspect, a method is provided for modifying an image region represented by two or more image channels, the method comprising: selecting one of the two or more image channels as a primary channel and another at least one of the two or more image channels as a secondary channel, processing the primary channel with a first neural network to obtain a modified primary channel, processing the secondary channel with a second neural network to obtain a modified secondary channel, wherein the processing with the second neural network is based on the modified primary channel, and obtaining a modified image region based on the modified primary channel and the modified secondary channel.

One of the advantages of this method may be improvement of the image modification performance due to possibility of adapting the primary channel by selecting it among the image channels.

For example, the step of selecting the primary channel and the secondary channel among the two or more image channels is performed based on an output of a classifier based on a neural network, to which the two or more image channels are inputted. Using a classifier enables training or designing such classifier in order to properly select the image channel to be the primary channel so that the quality of image modification (such as image enhancement) may be improved.

The two or more image channels may include a color channel and/or a feature channel. Color channels and feature channels reflect the image characteristics. Each kind of channel may provide information not present in other channel, so that collaborative processing may improve the channels with respect to the primary channel.

According to some embodiments, the image region is one of the following: a patch of a predetermined size corresponding to a part of an image or a part of a plurality of images, or an image or a plurality of images.

Processing images on a patch basis or multiple image basis enables to process regions of an image or video sequence differently, i.e. to change the selection of the primary channel. Since the content within the image and/or within the video sequence can vary, it may be advantageous for the image enhancement to adapt the primary channel.

In some exemplary implementations, the method further includes choosing a minimum size for the image region based on the number of hidden layers of the neural network, wherein the minimum size is at least $2*((kernel\_size-1)/2*n\_layers)+1$, with kernel_size being the size of the kernel of the neural network which is a convolutional neural network and n_layers being the number of the layers of the neural network.

Such lower bound for selection of the patch size enables, depending on the design of the neural network, to fully utilize the information of the processed image without adding redundancies by padding or the like.

According to an embodiment (combinable with any preceding or following embodiments and examples), the method further includes rearranging the pixels of each of the at least two image channels of the image region into a plurality, S, of sub-regions wherein: each of the sub-regions of an image channel among the at least two image channels contains a subset of the samples of said image channel, for all image channels, the horizontal dimensions of sub-regions are the same and equal to an integer multiple mh of the greatest common divisor of the horizontal dimension of the image, and for all image channels, the vertical dimensions of sub-regions are the same and equal to integer multiple mv of the greatest common divisor of the vertical dimension of the image.

With such rearrangements, the neural networks may be used to process images of which the image channels differ in dimension/resolution.

In particular, the S sub-regions of the image region are disjoint with S=mh*mv, and have horizontal dimension dimh and vertical dimension dimv, and a sub-region includes samples of the image region on the positions {kh*mh+offh, kv*mv+offv}, with kh $\in$ [0, dimh−1] and kv $\in$ [0, dimv−1], and each combination of offh and offv specifies the respective sub-region with offk $\in$ [1, mh] and offv $\in$ [1, mv].

With the above-mentioned determination of patch size, it is possible to utilize the image and to effectively adapt the patch size to the dimensions of the image for each channel, even when the channels differ from each other in resolution and/or dimensions (vertical and/or horizontal).

According to an aspect, a method is provided for encoding an image or a video sequence or images including: obtaining an original image region, encoding the obtained image region into a bitstream, and applying the modifying an image region obtained by reconstructing the encoded image region as mentioned above.

Employing the image modification in image or video coding enables improvement of the quality of the decoded images. This may be a quality in the sense of distortion which may be reduced. However, for some applications, there may be some special effects which may be desired and the modification may lead to their improvement (which does not necessarily reduce the distortion with regard to the original picture).

For example, the encoding may comprise a step of including into the bitstream an indication of the selected primary channel. This enables possibly better reconstruction at the decoder side; better in terms of distortion with respect to the original (not distorted) image.

According to an exemplary implementation, the method further includes obtaining a plurality of image regions, applying said method for modifying the obtained image region to the image regions of the obtained plurality of image regions individually, including into the bitstream for each of the plurality of image regions at least one of: an indication indicating that the method for modifying the obtained image region is not to be applied for the image region, or an indication of the selected primary channel for the region. Region based processing facilitates adaption to the image or video content.

When applying the method for modifying the obtained image region, the selection of the primary channel and the secondary channel may be performed based on the reconstructed image region without referring to the obtained image region input to the encoding step. This avoids additional overhead (rate requirements).

According to an aspect, a method is provided for decoding an image or a video sequence or images from a bitstream including reconstructing an image region from the bitstream; and applying the method for modifying the image region as described above.

Application of the image or video modification at the decoder side may improve the decoded image quality.

The method for decoding the image or the video sequence in some embodiments includes: parsing the bitstream to obtain at least one of: an indication indicating that the method for modifying the obtained image region is not to be applied for the image region, an indication of the selected primary channel for the region, reconstructing an image region from the bitstream, and in a case where the indication indicates a selected primary channel, modifying the reconstructed image region with the indicated primary channel as the selected primary channel.

Reconstruction based on side information may provide better performance in terms of quality as mentioned above for the corresponding encoding method. The modification may be applied as in-loop filter or as post-processing filter at the encoder and/or the decoder.

Moreover, an apparatus is provided for modifying an image region represented by two or more image channels, the quantizer device implemented by circuitry configured to perform steps according to any of the methods mentioned above.

According to an aspect, an encoder is provided for encoding an image or a video sequence or images, wherein the encoder comprises: an input module for obtaining an original image region, a compression module for encoding the obtained image region into a bitstream, a reconstruction module for reconstructing the encoded image region, and the apparatus for modifying the reconstructed image region.

According to an aspect, a decoder is provided for decoding an image or a video sequence or images from a bitstream, wherein the decoder comprises: a reconstruction module for reconstructing an image region from the bitstream; and the apparatus for modifying the reconstructed image region. The advantages of these apparatuses correspond to those of the above mentioned methods with similar features.

Moreover, methods corresponding to the steps performed by the processing circuitry as described above, are also provided.

According to an aspect, a computer product is provided comprising a program code for performing the method mentioned above. The computer product may be provided on a non-transitory medium and include instructions which when executed on one or more processors perform the steps on the method.

The above mentioned apparatuses may be embodied on an integrated chip.

Any of the above mentioned embodiments and exemplary implementations may be combined.

BRIEF DESCRIPTION OF DRAWINGS

In the following embodiments of the disclosure are described in more detail with reference to the attached figures and drawings, in which.

DETAILED DESCRIPTION OF THE EMBODIMENTS

Figure 1:
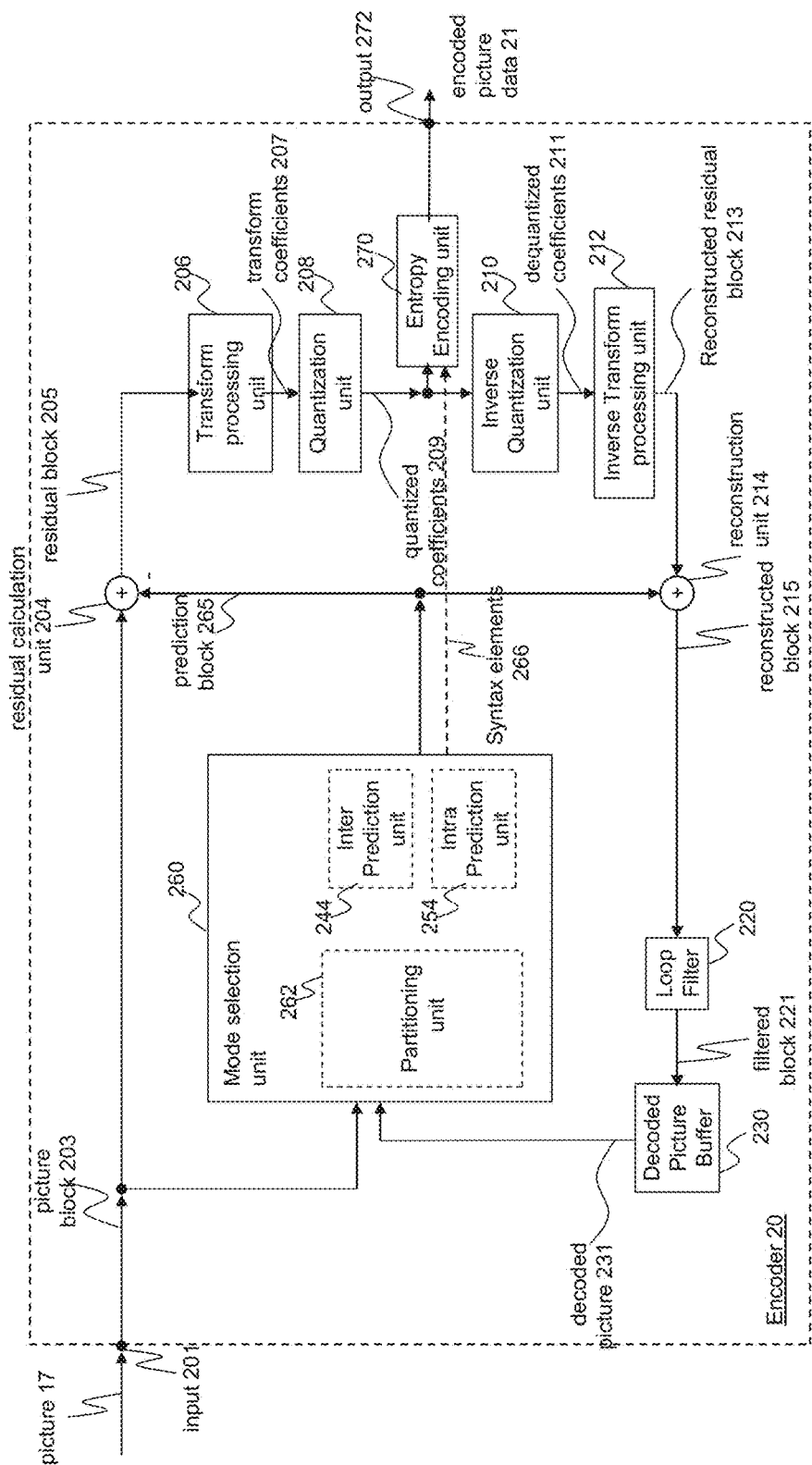
FIG. 1 is a block diagram illustrating an exemplary encoding device for encoding video.

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

Video compression may decrease the perceived quality of an image, and an image enhancement filter may generally be used to improve the output quality of compressed video.

Figure 2:
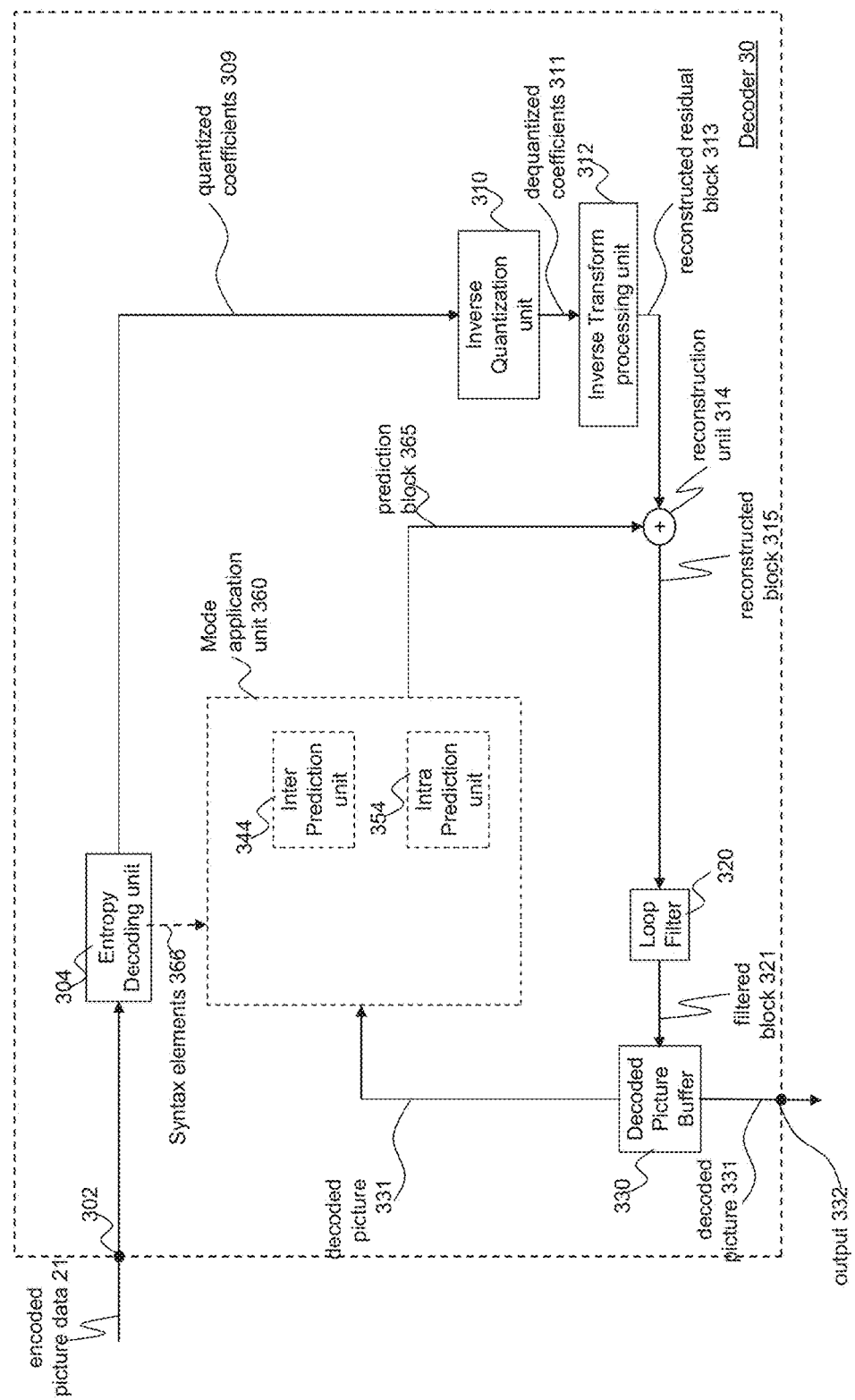
FIG. 2 is a block diagram illustrating an exemplary decoding device for decoding video.

FIG. 1 shows a schematic block diagram of an example video encoder 20 that may be also modified or configured to implement the techniques of the present disclosure, as will be explained below and with reference to further figures and embodiments. In the example of FIG. 1, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 1) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients. Embodiments of the video encoder 20 as shown in FIG. 1 may be configured to encode the picture 17 block by block, e.g. the encoding and prediction is performed per block 203.

Embodiments of the video encoder 20 as shown in FIG. 1 may be further configured to partition and/or encode the picture by using slices (also referred to as video slices), wherein a picture may be partitioned into or encoded using one or more slices (typically non-overlapping), and each slice may comprise one or more blocks (e.g. CTUs). Embodiments of the video encoder 20 as shown in FIG. 1 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

The transform processing unit 206 may be configured to apply a transform, e.g. a discrete cosine transform (DCT) or discrete sine transform (DST) or their integer approximations or the like, on the sample values of the residual block 205 to obtain transform coefficients 207 in a transform domain. The transform coefficients 207 may also be referred to as transform residual coefficients and represent the residual block 205 in the transform domain. Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209. The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. The quantization is a lossy operation, wherein the loss increases with increasing quantization step sizes. Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. Although the loop filter unit 220 is shown in FIG. 1 as being an in loop filter, in other configurations, the loop filter unit 220 may be implemented as a post loop filter which filters the reconstructed samples 215, but does not store the filtered samples into the buffer for usage by the inter-prediction. Rather, the filtered samples are output, e.g. for displaying or for storing the reconstructed image, or the like. The filtered block 221 may also be referred to as filtered reconstructed block 221. Some embodiments of the present disclosure provide image/video modification approach which may be employed as a part of the loop filter or the post filter.

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magneto-resistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time. In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB). For example, a coding tree unit (CTU) may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a coding tree block (CTB) may be an NxN block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly, a coding block (CB) may be an MxN block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

The set of intra-prediction modes may comprise, e.g. 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. The intra-prediction unit 254 is configured to use reconstructed samples of neighboring blocks of the same current picture to generate an intra-prediction block 265 according to an intra-prediction mode of the set of intra-prediction modes. The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not. The inter-prediction modes may include a mode operating with the motion field determination and representation as will be described in the following embodiments below. Such mode may be one of a plurality of inter-modes.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265, or, in general prediction for some samples of the current picture. Motion compensation, performed by the motion compensation unit, may involve fetching or generating the prediction block (prediction samples) based on the motion/block vector determined by motion estimation, possibly performing interpolations to sub-pixel precision. Interpolation filtering may generate additional pixel samples from known pixel samples, thus potentially increasing the number of candidate prediction blocks/samples that may be used to code a picture block. Upon receiving the motion vector for the PU of the current picture block, the motion compensation unit may locate the prediction block to which the motion vector points in one of the reference picture lists. The motion compensation unit may also generate syntax elements associated with the blocks, sample areas, and video slices for use by video decoder 30 in decoding the picture blocks of the video slice.

In addition or as an alternative to slices and respective syntax elements, tile groups and/or tiles and respective syntax elements may be generated or used.

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SB AC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 2 shows an example of a video decoder 30 that may be modified or configured to implement the techniques of this present disclosure. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 2, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 1.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. In some configurations, the loop filter unit 320 may be implemented as a post loop filter, as already mentioned above with reference to the encoder of FIG. 1. It is noted that it is possible to implement both filters: a loop filter and a post filter. The post filter may be employed to enhance the image 331 output e.g. for displaying. The loop filter may be employed to filter the reconstructed samples 315 which are then stored in the buffer for being use as reference picture in the inter-coding.

The decoded video blocks 321 of a picture are then stored in decoded picture buffer 330, which stores the decoded pictures 331 as reference pictures for subsequent motion compensation for other pictures and/or for output respectively display. The decoder 30 is configured to output the decoded picture 311, e.g. via output 312, for presentation or viewing to a user.

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block or sample-based based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles. Embodiments of the video decoder 30 as shown in FIG. 2 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 2 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 3B:
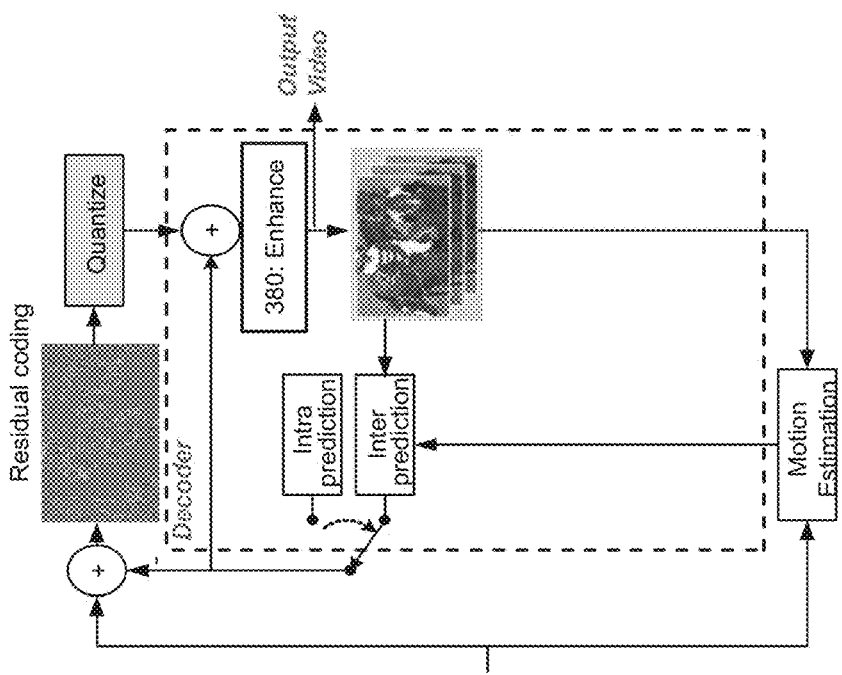
FIG. 3B is a block diagram with an encoder illustrating an application of an image enhancement as a loop filter.
Figure 3A:
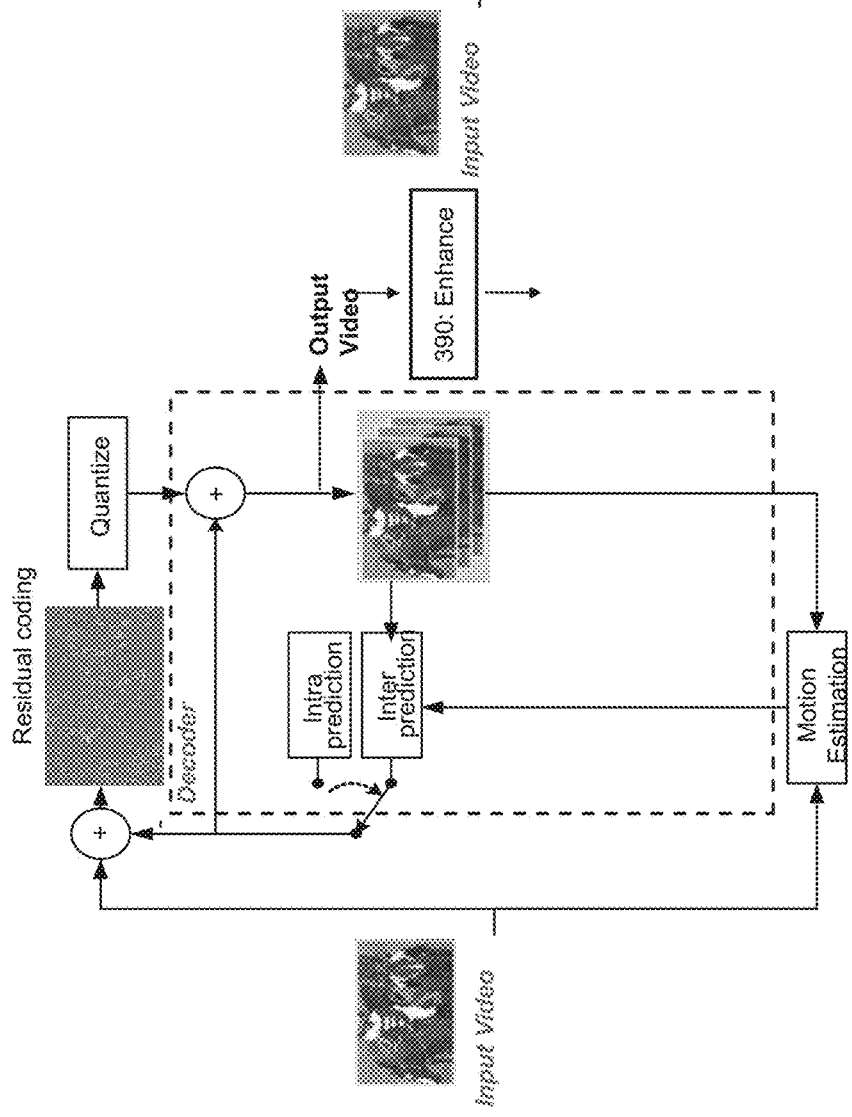
FIG. 3A is a block diagram with an encoder illustrating an application of an image enhancement as a post filter.

FIG. 3A shows enhancement 390 applied at a position of a post-filter, applying the modification to the output images. FIG. 3B shows enhancement 380 applied at a position of an in-loop filter (also referred to as loop filter herein), applying the transformation both to the output images and to the motion estimation reference picture buffer.

One type of image enhancement filters are improving the quality of a multichannel image by exploiting similarities between the channels. The performance of a multichannel image enhancement algorithm varies with some parameters of the input multichannel image (e.g. number of channels, their quality) and also varies across the image data in each channel.

Some embodiments of the present disclosure aim at analyzing the input image and selecting a suitable image enhancement parameters for each case.

Various image enhancement algorithms exist. Only a few of them utilize inter-channel correlation information for image enhancement. In the present disclosure, focus is put on multichannel image enhancement filters, which use neural networks, such as convolutional neural networks. In neural network based enhancement filters, a network is trained with two sets of images—one represents the original (target, desired) quality, and the other represents the range and types of the expected distortions. Such network can be trained to improve images impaired e.g. by sensor noise, or images impaired by video compression, or by other kinds of distortion. Usually, different (individual and separate) training is required for each distortion type. A more general network (e.g. handling a larger range and type of distortions) has a lower average performance. Here, the performance refers e.g. to quality of reconstruction which may be measured by objective criteria such as PSNR or by some metrics which also consider human visual perception.

In recent years, neural networks have gained attention leading to proposals to employ them in image processing. In particular, Convolutional Neural Networks (CNNs) have been employed in such applications. One possibility is to replace the compression pipeline by neural networks entirely. The image compression is then learned by a CNN end-to-end. Another possibility to reduce these compression artifacts is to apply a filter after the compression. Simple in-loop filters already exist in the HEVC compression standard. More complex filters, especially filters based on Convolutional Neural Networks (CNNs), have been proposed in the literature. However, the visual quality improvement is only limited.

A neural network is a signal processing model which supports machine learning and which is modelled after a human brain, including multiple interconnected neurons. In neural network implementations, the signal at a connection between two neurons is a number, and the output of each neuron is computed by some non-linear function of the sum of its weighted inputs. The connections are called edges. Neurons and edges typically have a weight that adjusts as learning proceeds. The weight increases or decreases the strength of the signal at a connection. The non-linear function of the weighted sum is also referred to as "activation function" or a "transfer function of a neuron". In some simple implementations, the output may be binary, depending on whether or not the weighted sum exceeds some threshold, corresponding to a step function as the non-linear activation function. In other implementations, another activation functions may be used, such as a sigmoid or the like. Typically, neurons are aggregated into layers. Different layers may perform different transformations of their inputs. Signals travel from the first layer (the input layer), to the last layer (the output layer), possibly after traversing multiple layers. The weights are learned by training which may be performed by supervised or unsupervised learning. It is noted that the above-described model is only a general model. For specific applications, a neural network may have different processing stages which may correspond to CNN layers and which are adapted to the desired input such as an image or the like.

In some embodiments of the present application, a deep convolutional neural network (CNN) is trained to reduce compression artifacts and enhance the visual quality of the image while maintaining the high compression rate. In particular, according to an embodiment, a method is provided for modifying an input image. Here, modifying refers to any modification such as modifications obtained typically by filtering or other image enhancement approaches. The type of modification may depend on a particular application.

One of networks which yields good results for a wide range of distortions without needing to be trained for each specific case is known from Cui, Kai & Steinbach, Eckehard. (2018): *"Decoder Side Image Quality Enhancement exploiting Inter-channel Correlation in a 3-stage CNN"* Submission to CLIC 2018, IEEE Conference on Computer Vision and Pattern Recognition (CVPR) Workshops, June 2018. Therein, a three-stage convolutional neural network (CNN) based approach is proposed, which can exploit the inter-channel correlation to enhance image quality at the decoder side.

Figure 4:
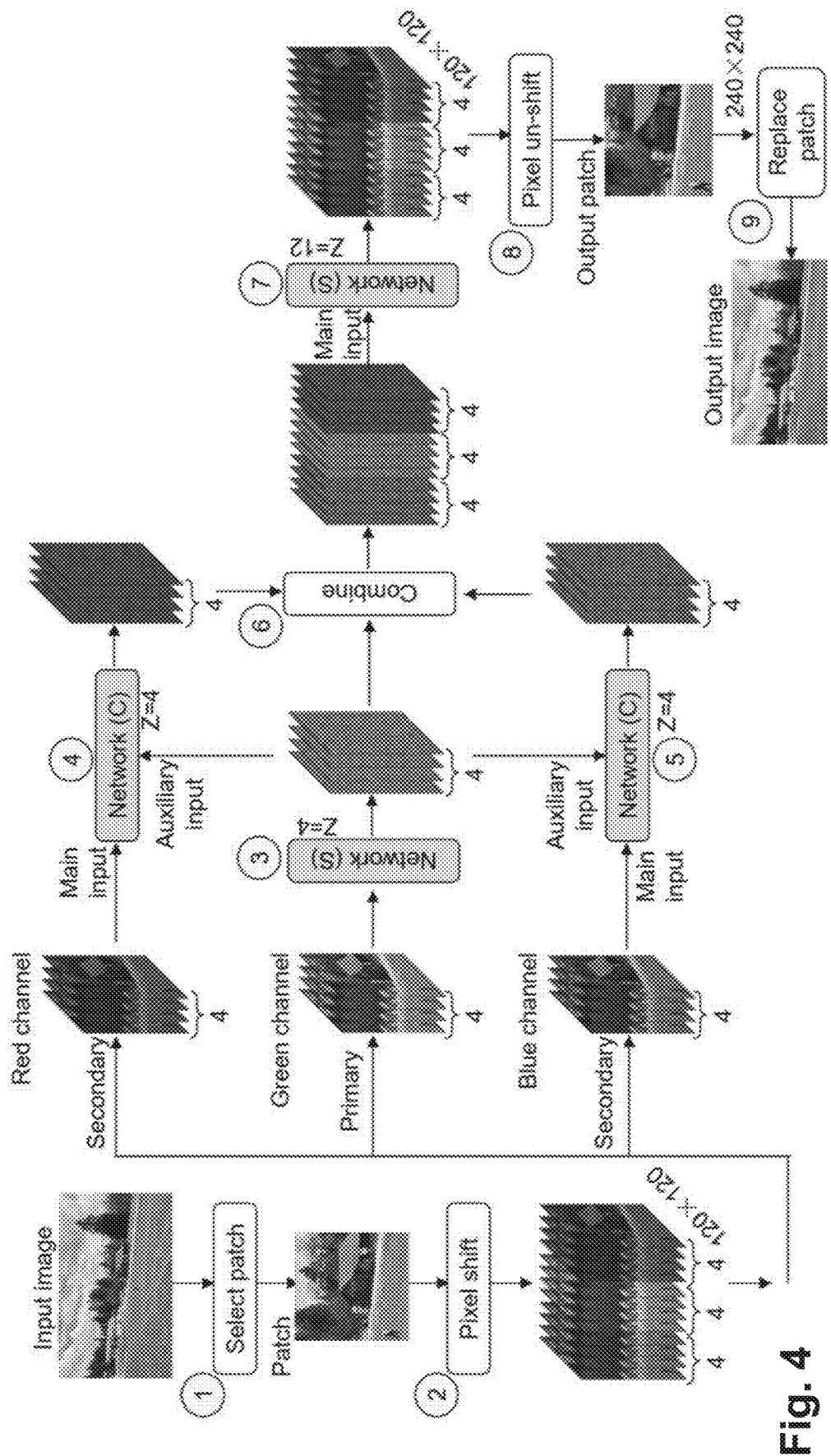
FIG. 4 is a schematically drawing of collaborative processing of three-color channels by a convolutional neural network.

FIG. 4 illustrates such three-channel CNN framework. CNN is a neural network, which employs a convolution in place of a general matrix multiplication in at least one of their layers. Convolutional layers convolve the input and pass its result to the next layer. They have some beneficial features in especially for image/video processing. The CNN of FIG. 4 is described and the applied stages are explained including the known arrangement as well as possible arrangements and alternatives which may facilitate application of the CNN in some embodiments of the present disclosure.

The input image is stored in an RGB (red, green, blue) format (color space). The input image may be a still image or it may be an image, which is a frame of a video sequence (motion picture).

Numbers in circles in FIG. 4 denote stages of processing. At stage 1, a patch is selected from the input image. In a particular example, the patch has a predetermined size, such as the size of 240×240 samples (pixels). The patch size may be fixed, or may be predetermined. For example, the patch size may be a parameter which may be configurable by a user, or an application, or conveyed within a bitstream and set accordingly, or the like. The selection of the patch size may be performed depending on the image size and/or on the amount of detail in the image.

The term "patch" here refers to a part of the image which is processed by filtering and the processed part is then pasted back in the position of the patch. Patch may be regular, such as rectangular or square. However, the present disclosure is not limited thereto and the patch may have any shape, such as a shape following the shape of a detected/recognized object, which is to be filtered. In some embodiments, the entire image is filtered (enhanced) patch by patch. In other embodiments, only selected patches (e.g. corresponding to objects) may be filtered while the remaining parts of the image are not filtered or filtered by another approach. By filtering, any kind of enhancement is meant.

The selection may be a result of sequential or parallel processing in which all patched are filtered. In such case, the selection may be performed in a predetermined order such as from left to right and from top to bottom. However, the selection may also be performed by a user or an application and may only regard a part of the image. A patch may be continuous or may be distributed.

In case the entire image is divided into patch areas, padding may be applied it an integer multiple of the patch dimensions (vertical or horizontal) does not match the image size. The padding may include mirroring of the image portions which are available over an axis formed by the image boundary (horizontal or vertical) to achieve the size which fits an integer number of patches. More particularly, the padding is performed so that the vertical dimension (number of samples after padding) is an integer multiple of the vertical patch dimension. Moreover, the horizontal dimension (number of samples after padding) is an integer multiple of the horizontal patch dimension.

Then, the image enhancement may be performed by sequentially or in parallel selecting and processing each of the patches. The patches may be non-overlapping as suggested above. However, they may be also overlapping, which may improve quality and reduce possible boundary effects between separately processed patches.

Figure 5:
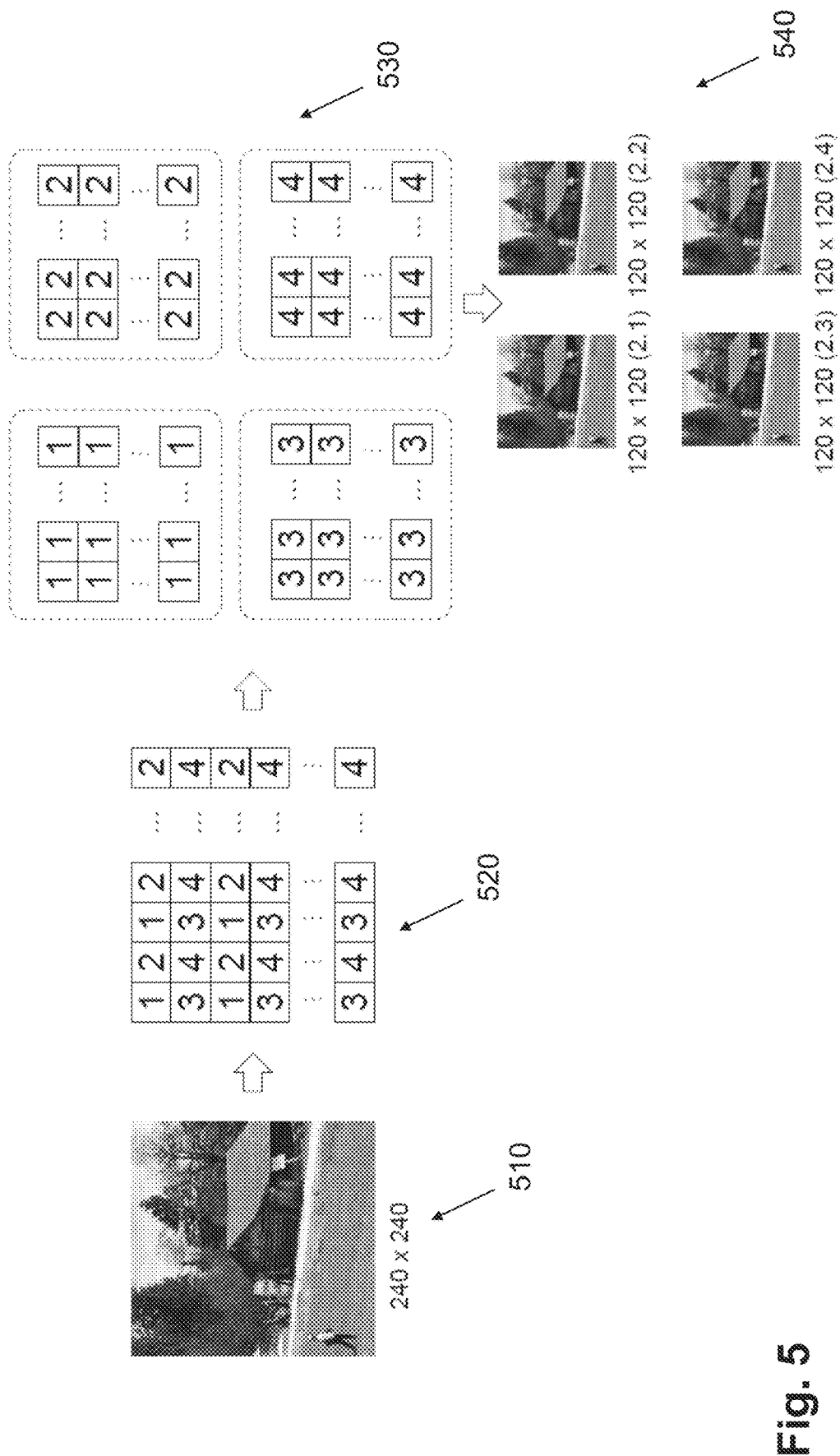
FIG. 5 is a schematic drawing illustrating pixel re-arrangement.

In stage 2, the pixels of the patch are re-ordered for easier processing. The re-ordering may include so called pixel-shifting as is illustrated in FIG. 5. The pixel shift reorders the pixels in each channel, so that a channel with dimensions N×N×1 is transformed to a 3D-array with dimensions N/2×N/2×4 (here, the symbol "×" stands for "times", i.e. for multiplication). This is performed by subsampling the channel where a single value is taken from each non-overlapping block of 2×2 values. The first layer of the 3D array is created from the top-left values, the second layer from the top-right, the third from the bottom-left values, and the fourth from the bottom-right values. At the end of the pixel shift operation, a 3-channel RGB patch with size N×N pixels becomes a stack (3D-array) with dimensions N/2×N/2×4. This pixel shifting is mainly done for computational reasons—it is easier for a processor (such as a graphical processing unit, GPU) to process narrow and deep stacks rather than wide and shallow ones. It is noted that the present disclosure is not limited to subsampling by 4. In general, there may be subsampling by more or less resulting in corresponding stack depth of more or less resulting subsampled images.

FIG. 5 shows a detailed example of the pixel shifting. 1. In this example, patch of the input size 240×240 is taken in step 510. Then, four sub-images are created by taking every second pixel in horizontal and in vertical direction. Step 520 shows assignment of pixels of the image to the respective four sub-sampled images denoted as 1, 2, 3, and 4. The proceeding is as follows:

To obtain image 2.1 (see step 540): Create a sub-image 1 by starting from the top-left coordinate at a position (0, 0) in the original (240×240 patch) image. Then take every second sample in the vertical direction and every second sample in the horizontal direction. The grouping is shown on the top left hand side of step 530.

To obtain image 2.2 (see step 540): Create sub-image 2 by starting from top-left coordinate at position (0,1) in the original image. Then take every second sample in the vertical direction and every second sample in the horizontal direction. The grouping is shown on the top right hand side of step 530.

To obtain image 2.3 (see step 540): Create sub-image 3 by starting from top-left coordinate at position (1,0) in the original image. Then take every second sample in the vertical direction and every second sample in the horizontal direction. The grouping is shown on the bottom left of step 530.

To obtain image 2.4 (see step 540): Create sub-image 4 by starting from top-left coordinate at position (1,1) in the original image. Then take every second sample in the vertical direction and every second sample in the horizontal direction. The grouping is shown on the bottom right of step 530.

In stage 3 of FIG. 4, the green channel is processed in a single-channel mode. In this example of FIG. 4, it is assumed that the green channel is the primary channel and the remaining channels are secondary channels. It is assumed that distortion of each channel is strongly correlated with the channel color. It is assumed that the green channel is the one with the least distortion. On average, this may be a fair guess for an RGB image affected by sensor noise or compression, as RGB images are captured using a RGGB sensor pattern (Bayer pattern), capturing more green samples than red and blue samples. However, according to the present disclosure, as will be discussed below, the green channel is not necessarily the best and it may be advantageous to perform channel selection. Moreover, channels other than color channels may be used and may provide higher quality information.

In FIG. 4, the primary (i.e. green) channel is processed alone in stage 3. The red channel is processed together with the improved green channel (stage 4). The Blue channel is processed together with the improved green channel (stage 5). The Improved red, green, and blue channels are then stacked (combined) together (stage 6) and are processed with no side information or with side information as will be explained below with reference to FIGS. 8 and 9.

Overall, the framework has four NNs stages—stages 3, 4, 5, and 7 in FIG. 4. Stages 3 and 7 input a single 3D-array of values and output a 3D-array with the same size as the input. Stages 4 and 5 input two 3D-arrays, one main and one auxiliary. The output is with the same size as the main output, and is intended to be a processed (e.g. enhanced) version of the main input, while the auxiliary input is used only to aid the processing and is not outputted.

Figure 6:
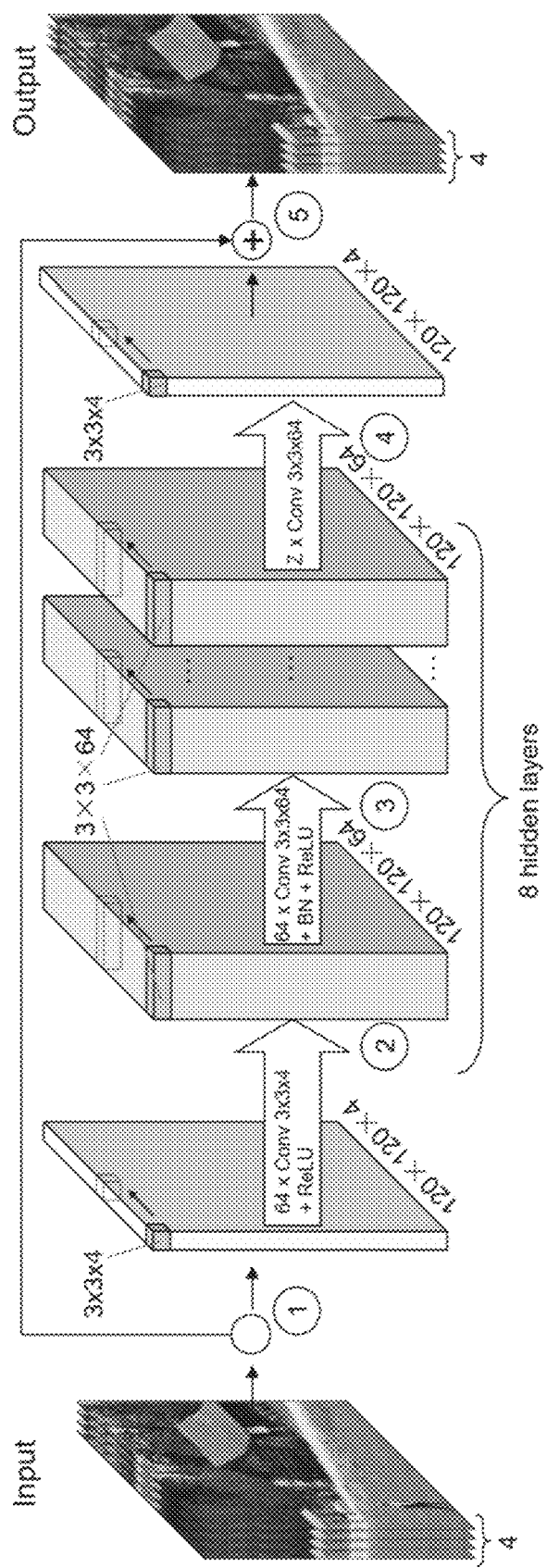
FIG. 6 is a schematic drawing illustrating neural network processing in a single-channel mode.

FIG. 6 shows an example of the single input neural network (in particular, a CNN, corresponding to Network (S) in FIG. 4). The Network (S) has as an input a stack of 4 planes, namely the 3D-array of 120×120×4 corresponding to the four subsampled patch images output of the pixel shifting shown in FIG. 5. The first CNN layer performs 64 convolutions using 64 kernels with size 3×3×4. The output of each convolution is rectified with a rectified linear unit (ReLU) function, and each convolution creates one plane in the first hidden layer. The activation function may be the ReLU. The ReLU is zero for all negative numbers and a linear function (ramp) for the positive numbers. However, the present disclosure is not limited thereto—different activation functions such as sigmoid or step function, or the like may be used in general. A ReLU function comes close to sigmoid with its shape, but is less complex.

The hidden layers have identical size of 120×120×64. Each hidden layer performs 64 convolutions with 64 kernels of 3×3×64. The output of each convolution is rectified (with a ReLU) and normalized (with a batch normalization, BN), and creates one plane in the next hidden layer. There are total of eight hidden layers. The last hidden layer performs only 4 convolutions and outputs 4 planes. Finally, the original input is added to the processed data. In such structure (ResNet), the CNN layers aim to synthesize the difference between the original and the desired signal.

As briefly sketched above, FIG. 6 shows five different stages (denoted by umbers in circles). In the first stage, a stack of Z (four I the previous examples, but Z in general) bitmaps is taken with the patch size of 120×120, and feed it to the first layer. In stage 2, the layer is padded with one value on each side of the patch. Then the padded layer is convolved with a kernel of size 3×3×Z, and processed with a ReLU unit. There are 64 different kernels and each one creates one slice of the next layer. In stage 3, there are P hidden layers (P=8 may be a good tradeoff between complexity and performance). Each layer is 120×120×64, and it is padded and processed with a kernel 3×3×64. There are 64 different kernels for each layer (totally 64×P), and each one creates one slice of the next layer. Afterwards, each layer is processed by the ReLU and BN function. $\hat{X}=(X-\mu_X)/\sigma^2_X$, where X is the network activity of group of neurons for a given input, $\hat{X}$ is the batch normalized output, $\mu_X$ denotes the arithmetic mean value of X along a singular dimension, and $\sigma^2_X$ denotes variance of X along a singular dimension. The variance and mean are statistical (computed) values (sample based estimations).

In stage 4, the final hidden layer is processed by N convolution kernels 3×3×64, and outputs the stack with size Z. In stage 5, the input is added to the processed output, as the network is trained to approximate the difference between the input and the desired output.

Figure 7:
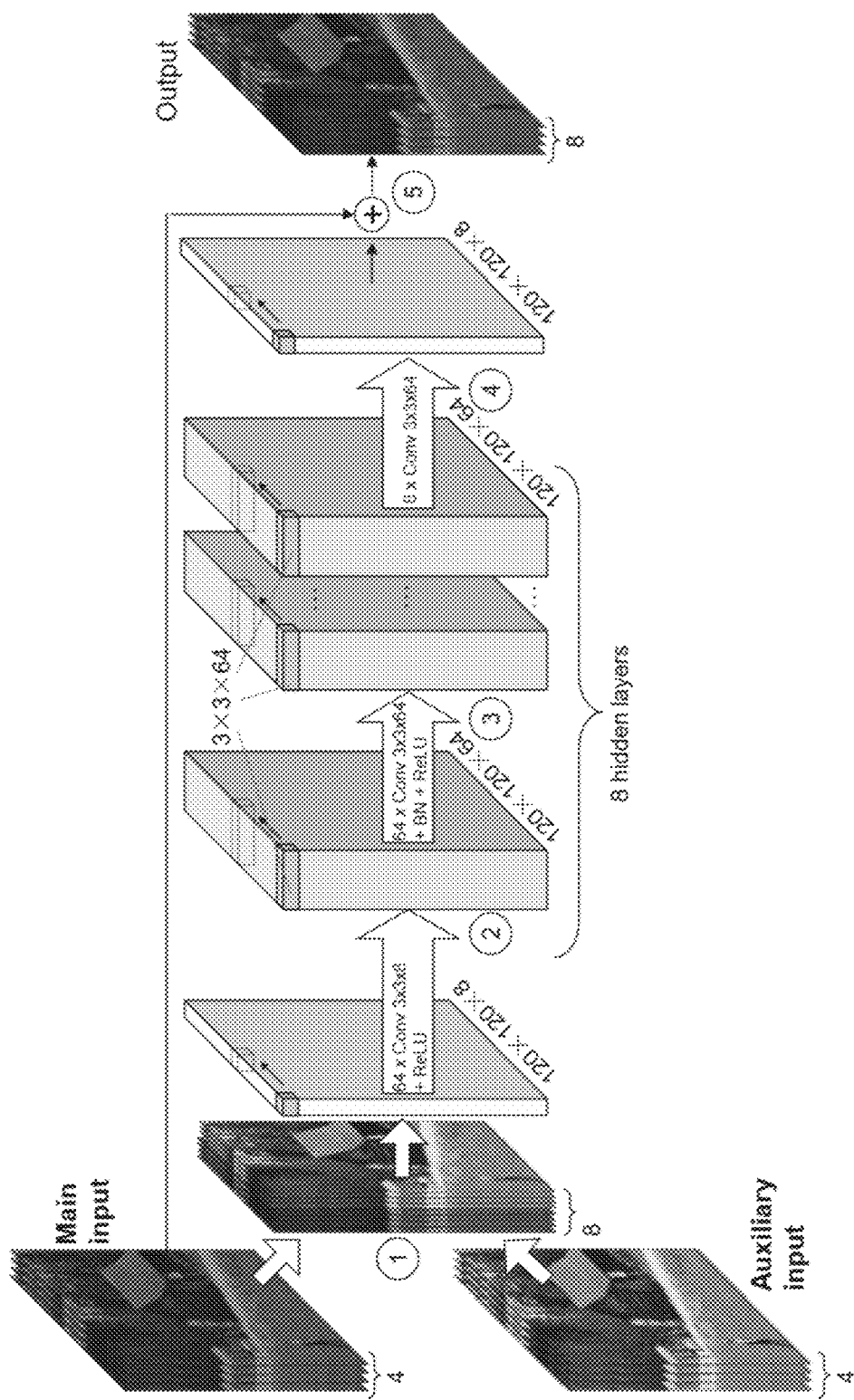
FIG. 7 is a schematic drawing illustrating neural network processing in a collaborative (cooperative) mode.

FIG. 7 shows a dual-input CNN (Network (C)) similar to the single input CNN described above, with two differences. The first difference is that the input is twice as deep (8 planes), so the convolution kernels of the first layer is having the size 3×3×8. The processing in the hidden layers is identical. The second difference is that only the main channel is added to the processed output, as the network aims to approximate the difference between the main channel and the desired output. (As if the auxiliary channel is processed but its output is unused). In other words, in stage 4 of FIG. 4, the red channel is processed collaboratively with the enhanced green channel. Such processing is illustrated in FIG. 7. The processing takes a main stack of Z bitmaps, processes if co-operatively with an auxiliary stack of Y bitmaps, and outputs a stack of bitmaps with the same dimensions as the main output. FIG. 7 also shows five different stages as follows:

In stage 1, the main input is stacked with the auxiliary input, producing a stack with the size of Z+Y. Only the main input is fed to the output (see stage 5). The combined stack is processed with a convolution kernel with size 3×3×(Z+Y) in stage 2. The remaining processing stages are similar to the single-channel mode. In particular, in this example, stages 3, 4, and 5 are identical to the single-channel mode. In addition, in stage 5, the main input is added to the output.

Similarly, in stage 5 of FIG. 4, the blue channel is processed collaboratively with the enhanced green channel. The processing is similar to the processing described with reference to the red channel and FIG. 7.

It is noted that in the present disclosure, the term "channel" or "image channel" does not necessarily refer to a color channel. Other channels such as a depth channel or other feature channel may be enhanced using the embodiments described herein.

In stage 6 of FIG. 4, all processed channels (red, green, blue) are combined into Z=12 (4 sub-sampled images per color channel) images of the size 120×120. Here, the combination means stacking together, as a common input for the next stage 7. In stage 7, the combined channels are processed together by the Network (S).

In stage 8, the pixels are re-ordered back to form the processed patch. This may include removing the padding by cropping the mirrored portions. It is noted that the above-mentioned padding by mirroring is only one of possibilities how to perform the padding. The present disclosure is not limited to such specific example.

In stage 9, the processed patch is inserted back to the original image. In other words, the original image is updated by the enhanced patch. During the training procedure, a set of original and distorted images are used as input, and all convolution kernels of all 4 networks are selected. The aim of the network is to get a distorted image and produce a close match to the original image.

CNN-based multichannel enhancement filter as described above works in a rigid, non-adaptive way—the processing parameters are setup during the design (or training) of the filter, and are applied in the same way regardless of the content of the image passing through the filter. However, an optimal selection of the primary channel can vary from image to image or even for parts of the same image. For the image enhancement quality it is advantageous if the primary (leading) channel is the channel which has the highest quality, meaning the lowest distortion. This is because the primary channel is involved also in the enhancement of the remaining channels. The inventors recognized that by carefully choosing the primary channel for each patch or each image or the like a better performance may be achieved, which has been confirmed by experiments. Secondly, the enhancement performance (of all enhancement filters) varies with the image quality of the input. It works optimally for a range of distortion strengths, and does not provide much improvement for some very high or very low distortion levels. This is because a high quality input can barely be improved more and a low quality input is too distorted to be reliably improved. As a consequence, for some inputs it is beneficial to skip the enhancement processing altogether. Thirdly, the above mentioned (cf. FIG. 4) image enhancement is designed for an RGB input, where the resolution of all three channels is identical. However, in some video standard formats (e.g. YUV 4:2:0 or YUV 4:2:2 or the like) different channels may have different resolutions and number of pixels. It is noted that the image modification as described herein is not necessarily applied during encoding or decoding. It may be used also in pre-processing. For example, it may be used to enhance image or video in the raw format, such as a Bayer pattern based format. In other words, the modification of image may be applied to any images or videos.

Some embodiments of the disclosure provide a modular and tunable enhancement filter that may be capable of adapting to different input formats and different contents. It can process multichannel image formats with arbitrary number of channels and different number of pixels in each channel. In addition, a content analysis module is added, which can work in a no-reference setup (i.e. only by analyzing the distorted image without knowledge of the original) shown in FIG. 8 or in a reference setup shown in FIG. 9. Following the analysis, the enhancement filter can be tuned to process the input channels in a particular order, or to skip processing altogether.

In particular, a method (such as 800 or 900) is provided for modifying an image region represented by two or more image channels. The term "modifying" here refers to any modification such as image filtering or image enhancement, or the like. The two or more channels may be color channels or other channels such as depth channels or multi-spectral image channels or any other feature channels. The method comprises selecting 840, 970 one of the two or more image channels as a primary channel and another at least one of the two or more image channels as a secondary channel. It is noted that the primary channel can (according to some embodiments) also be considered as a leading channel. The secondary channel can (according to some embodiments) also be considered as a responding/reacting channel.

The method further includes the step of processing the primary channel with a first neural network to obtain a modified primary channel. The first neural network may be, for example the Network (S) of FIG. 4 or the network described in FIG. 6. The method further includes processing the secondary channel with a second neural network to obtain a modified secondary channel. The processing with the second neural network is based on the modified primary channel. The second neural network may be, for example the Network (C) of FIG. 4 or the network described in FIG. 7. These networks of FIGS. 4, 6, and 7 are only exemplary and, in general, the networks with a different number and size of layers may be employed.

The method further includes obtaining a modified image region based on the modified primary channel and the modified secondary channel. This obtaining step may correspond to the combining of the modified primary and secondary channels and to further processing them together, e.g. as shown on FIG. 4 by the Network (S).

Figure 8:
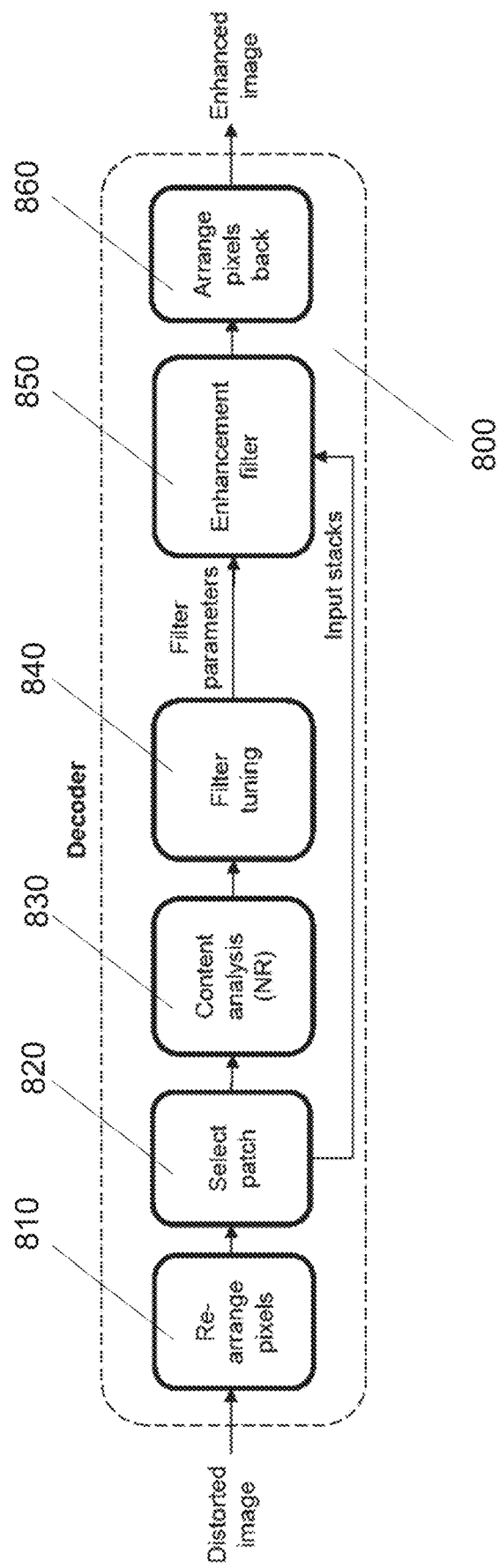
FIG. 8 is a flow diagram illustrating processing at a decoder including image enhancement independent of encoder-based side information.

This method will be further described with reference to FIGS. 8 and 9. FIG. 8 shows a decoder or decoding method 800, which includes input of an e.g. distorted image which is to be modified. This distorted image is provided to a pixel rearranging module 810. The pixel re-arrangement may be performed in the same way as the pixel shifting described with reference to FIG. 5 above. However, other methods can be used and the pixel rearranging pattern 520 may look differently for different channels, especially if they have different sizes (dimensions and/or resolutions). It is noted that the present disclosure applies rearranging as it is means for providing a same input format of a limited size to the neural network. However, this step may not necessary for some networks or in cases when the image patches are selected to already have the suitable size or generally for other implementations.

FIG. 800 further shows step 820 of selecting a patch for processing. it is noted that this step does not necessarily mean that there is some intelligence in selecting the patches, the selection may be done according to a sequential processing (e.g. in a loop) or may be performed for two or more patches (or even all patches) at once, for example when parallel processing is applied. The selection may also correspond to further examples mentioned with reference to FIG. 4. The selection step merely correspond to determining which patch is to be processed by the image modification.

The following step 830 includes content analysis. In this step, the image is analyzed to determine which of the channels should be selected as the primary channel and which of the channels should be processed as secondary channels. Then, step 840 includes filter tuning, in which the filter (meaning the image modification arrangement) is configured (set) to handle one channel as the primary channel and another (or more than one) channel as a secondary channel. These two steps 830 and 840 corresponds to the image channel selection in this exemplary embodiment. In FIG. 8, the content (image) analysis 830 is performed at the decoder side (e.g. as a part of image or video decoding) based on the analysis of the decoded image content. Accordingly, in this exemplary embodiment, no side information regarding the setting of the primary/secondary channels is necessary. In FIG. 8, the operation at a decoder is shown. However, the operation at the encoder can be performed in the same manner: after the reconstruction of the image, the color channel selection and the corresponding image enhancement may be performed as a loop filter or as a post filter.

In step 850, the actual image modification is performed. The image modification is based on the parameters (referred to in the figure as filter parameters resulting from the filter tuning). The selected and possibly rearranged patch is modified. After the modification 850, FIG. 8 the pixels may be arranged back 860 in case the image rearrangement in step 810 was applied. The (re)arrangements 810 and 860 may include padding and/or subsampling. It is noted that the term subsampling employed in this context (of pixel rearrangement) is not a subsampling resulting in image quality loss. Rather, the subsampling is performed to divide image (patch) into a plurality of subsampled versions of the image (patch) as was described with reference to FIG. 5 above.

Figure 9:
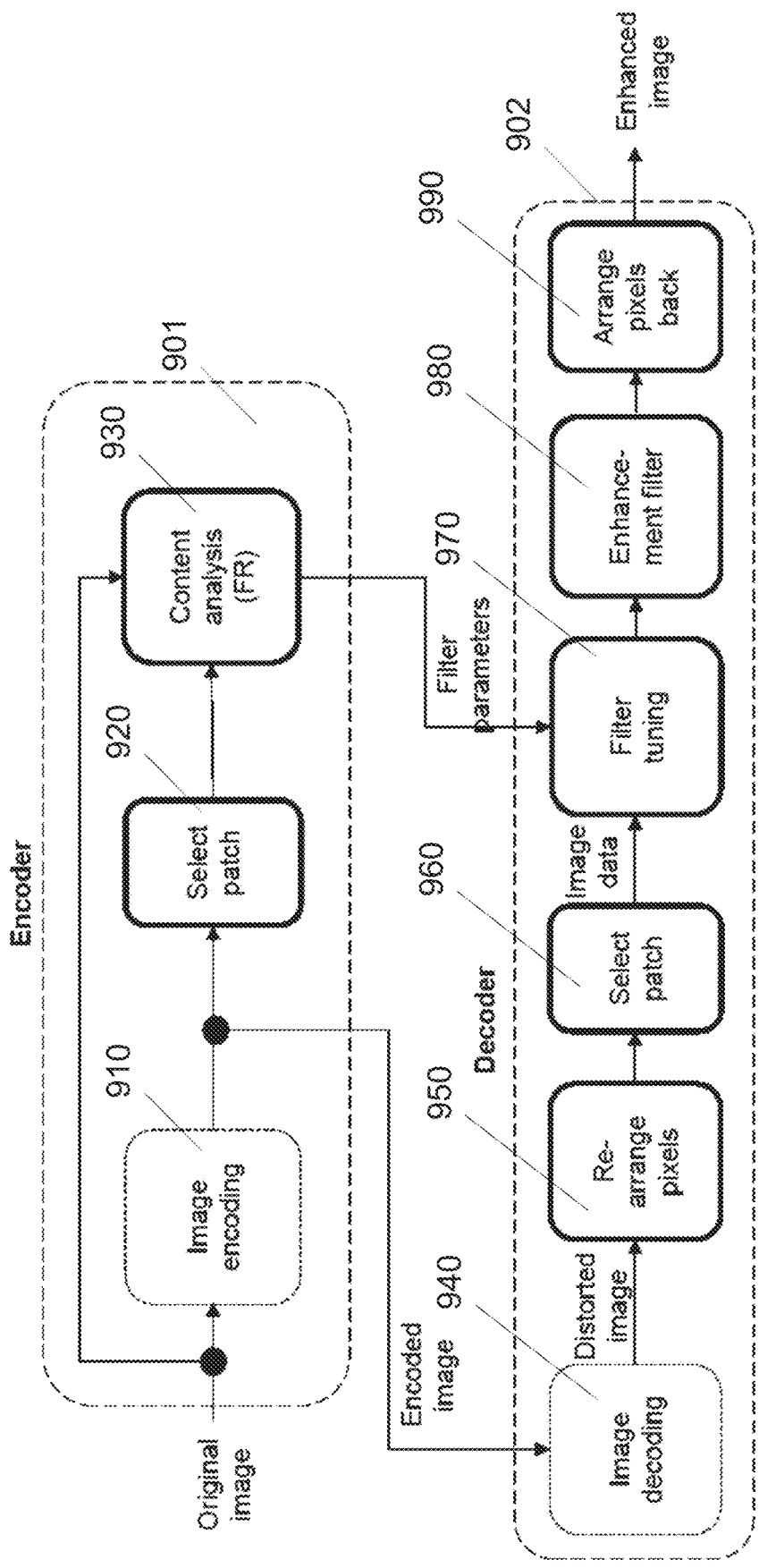
FIG. 9 is a flow diagram illustrating processing at an encoder and a decoder including image enhancement employing encoder-based side information.

FIG. 9 shows another exemplary embodiment, in which side information is conveyed from the encoder to the decoder in order to configure the image modification. In particular, FIG. 9 shows an encoder side 901 and a decoder side 902. At the encoder side, the original (undistorted) image is encoded in step 910. The encoding may include lossy compression for example due to quantization, as described above with reference to FIG. 1. The original image is also input to a processing module 930. Step/module 920 performs patch selection as described above for step 820. The step/module 930 then analyses the image (patch) and performed the selection of the primary (and thus also the secondary) channel. In order to enable decoding at the decoder side 902, side information is conveyed from the encoder side 901 to the decoder side 902. Moreover, step 910 generates encoded image (video) which may be stored in a bitstream. The same or a different bitstream may then carry the filter parameters generated in step 930.

At the decoder side 902, the encoded image is decoded I step 940. This may be performed, for instance with a decoder such as the decoder described with reference to FIG. 2. However, it is noted that neither the encoder nor the decoder are limited to those examples shown in FIGS. 1, 2, and 3. In general, since the image modification described herein is applied to the reconstructed image, it is applicable to any images, which do not even have to be result of lossy compression. The encoder and decoder may also implement the image modification and they do not have to be hybrid codecs. Rather, artificial intelligence based (e.g. neural network based) encoders and decoders or any other encoders and decoders are applicable.

The result of the decoding 940 may be a distorted image. The term decoding here does not necessarily mean a complete decoding. It rather refers to reconstruction of the image, which may be also performed in loop, i.e. during the actual decoding in case of the video decoding. The distorted image is then rearranged 950, for instance in a similar manner as in step 810. In step 960, a patch is selected (in general, image or image portion for the image modification is selected), which may be implemented as described above for step 820.

It is noted that the steps described with reference to FIGS. 8 and 9 may be also seen as functional modules of an apparatus performing the respective steps. The apparatus may be implemented by one or more hardware pieces including processors and memories. The selected image data is then passed to step/module 970. In module 970, the filter (image modifier) is tuned (configured) by the parameters received from the encoder side (e.g. conveyed in the bitstream). Then the image data is filtered (modified) in step 980 with the image modifier properly set. The filter parameters may include but are not limited to the indication of selection of the primary image channel. After image modification 980, in case image rearrangement was applied in step 940, in step 990, the image is arranged again into its original shape and form. This may be performed similarly as described for step 860 above.

It is noted that in FIG. 9, the focus is given on the description of the decoder. However, the encoder may also include steps 950 and 970 to 990. In other words, the encoder may also apply the image modification in the loop or as a post-filter, as shown schematically in FIG. 3. For example, step 950 may precede step 920 and steps 970 to 990 may be performed after step 930.

FIGS. 8 and 9 differ from each other in particular by the way the image modification processing is set up. In FIG. 8, the selection of the primary image channel is based on the image analysis of the image to be modified. Such analysis may be performed in the same way at the encoder side and the decoder side without knowledge of the undistorted image. On the other hand, FIG. 9 shows an approach in which the image analysis is performed on the basis of the original image, i.e. image before the distortion (e.g. caused by image encoding including lossy compression). Thus, such information is not derivable at the decoder side at which the original image is unknown. Therefore, the parameters derived based on the original image (such as the primary image channel selection) are signaled. The stand-alone primary channel determination may have a broader usage also in scenarios in which the original is unknown and saves overhead caused by signaling. On the other hand, the approach of FIG. 9 may provide more accurate reconstruction since the image channel selection may be performed with the knowledge of the original image, which is, at the same time, the desired target of the reconstruction. In other words, the image modification aims at modifying the distorted image so that it comes possibly close to the image without distortion, i.e. to the original image.

FIG. 8 is referred to as a non-reference embodiment in which no reference to original image is necessary. FIG. 9 is referred to as a (full-)reference embodiment, in which the original image is taken into account. The full-reference embodiment has two parts, one is part of an image/video encoder 901, and the other is part of the image decoder 902. In the encoder 901, the content analysis block has access to both original and compressed (i.e. distorted) data. It can select a patch and analyze it by comparing it to a patch from the same place in the original image. The selection of optimal filter parameters is sent (signaled) together with the encoded image.

In summary, some embodiments of the present disclosure provide an adaptive image enhancement using e.g. a CNN-based filter based on inter-channel correlation. In particular, processing parameters are automatically tuned based on an analysis of the input image. The tuning of the parameters could happen independently in the decoder without the need for signaling of side information. Moreover, the topology and processing order can be tuned to a range of input image formats as will be shown below for images in which different image channels have different resolution (dimensions). The number of pixels per channel can also be configurable for the image enhancement and may have impact on the selection of other parameters. The number of image channels may also be taken into account when configuring the image modification.

According to an exemplary implementation, the step 840, 970 of selecting the primary channel and the secondary channel among the two or more image channels is performed based on an output of a classifier 1050. The classifier (in general, image analyzer) is implemented for instance using a neural network, to which the two or more image channels are inputted.

Figure 10:
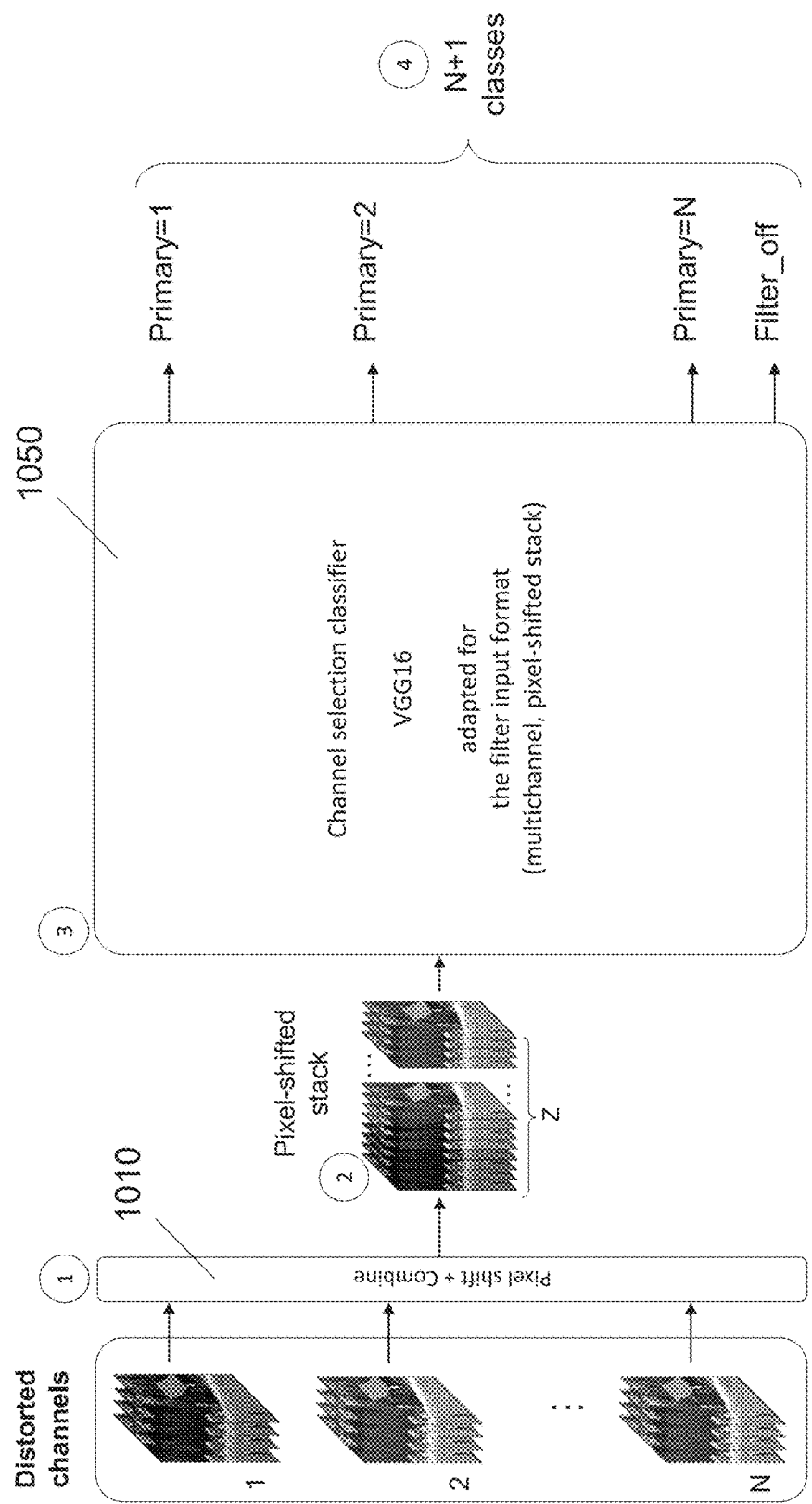
FIG. 10 is a schematic drawing illustrating an exemplary classifier applicable for the channel selection.

FIG. 10 illustrates an exemplary image classifier 1050. This exemplary image classifier 1050 may be a part of the image analysis steps/modules 830 and 930 in FIGS. 8 and 9. On the left hand side, the distorted channels are input to the first stage corresponding to the pixel rearrangement described above. The resulting channel stacks produced by the pixel rearrangement (such as pixel shifting) are combined into a common stack, with a depth of Z, where Z is the sum of the depth of each stack. The stack is fed to a CNN-based classifier, which is trained to produce N+1 classes, where N classes correspond to the case "Select channel N as primary" and the last class is "skip processing of this patch". The classifier in this particular example is implemented as a common CNN classifier, for example a VGG16 classifier, which is adapted to work on a multilayer 3D-array input with depth of Z. It is noted that the VGG16 based implementation is only exemplary and that any other classifier may be used. For illustration, a VGG16 classifier, which may be used to perform the image analysis 1050, is shown in FIG. 11.

Figure 11:
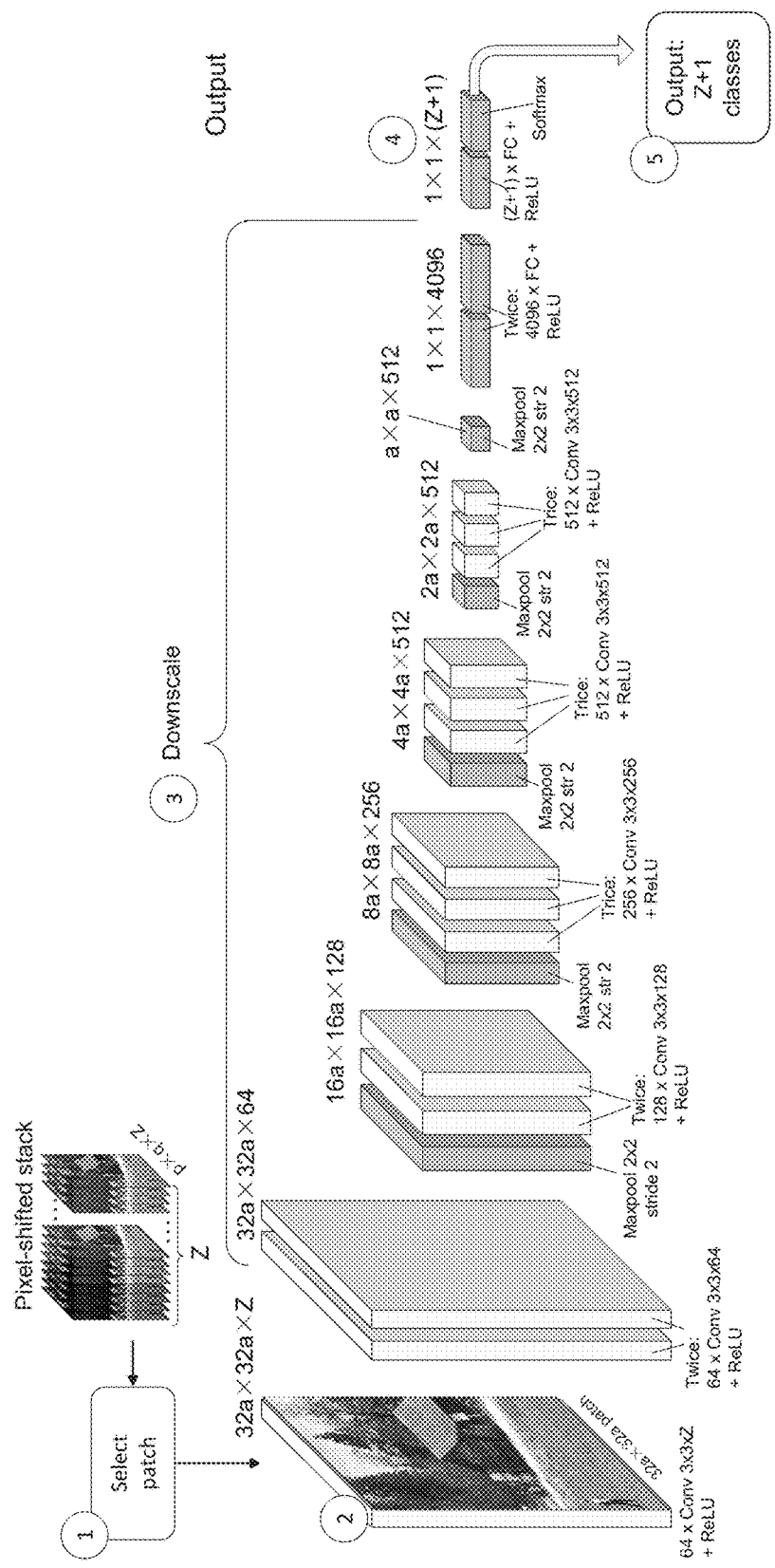
FIG. 11 is a block diagram illustrating channel selection preceding collaborative channel processing.

In particular, FIG. 11 shows processing performed by an exemplarily adapted VGG16. In the first stage, a patch is selected from the full stack. The patch may have size of 32a×32a×Z, where a ∈ Z, and Z is the depth of the full stack (e.g. Z=6 for YUV 4:2:0). Then, in a second stage, 64 convolutions are performed with a kernel size of 3×3×Z. Each convolution builds one layer of the next stage. In the third stage, in six steps, the planar size of the patch is decreased to a×a, and the depth is increased to 4096. Along the way, spatial features are transformed to more and more general patch features. These stages follow the typical VGG scheme. In the fourth stage, the final layers pool the general features into Z+1 classes. Finally, in stage 5, the output of the network is a class, specifying the best processing parameters for the patch, e.g. Primary=N (primary channel is the channel N) or Filter_off (indication that the image enhancement should not be applied).

FIG. 10 shows the exemplary classifier 1050 based on machine learning. However, the present disclosure is not limited to such classifier. Rather, any other classifier may be used, meaning classifier other than the VGG16 based classifier. The classifier may be based on a neural network or a convolutional neural network. However, the classifier may be also implemented by some algorithm such as an algorithm determining the level of detail, and/or strength and/or direction of edges, distribution of gradient, movement characteristics (in case of video) or other image features. Based on comparison of such features for the respective image channels, the primary channel may then be selected. For example, as a primary channel, the image channel including most or sharpest edges (corresponding to most details) may be selected.

The classifier 1050 provides N+1 outputs including N outputs which indicate an amount of feature making N-th channel as primary channel. Thus, the channel with a highest value of N may then be selected as the primary channel. In addition, one output (N+1)-th indicates whether or not the image modification shall be applied at all. It is noted that it is possible to leave out such decision. The decision may be also made based on the distribution and/or amount of the N features. Alternatively, the decision may precede the application of the classifier and be based on additional information such as compression parameters (e.g. amount of quantization, size of the patch, resolution of the image, and/or other compression parameters).

It is noted that classifiers may be applied which upon entering N image channels deliver the number of channel to be selected. In other words, the present disclosure is not limited to the particular or similar classifier as the classifier 1050 shown in FIG. 10.

After application of the classifier 1050, the filter tuning step/module 840, 970 may merely include a program logic, which either:
a) If the result of the patch analysis is "Select channel N as primary", it reroutes the input stack N to be processed as primary channel and the other stacks as secondary channels.
b) If the result of the patch analysis is "skip processing of this patch", the input stacks are fed directly to the pixel arrangement block. It is conceivable to provide a copy of the distorted image directly to the output if the distorted image is buffered, so that the arrangement 990 reversing the re-arrangement 910 (1010) does not have to be performed.

As mentioned above, the two or more image channels include a color channel and/or a feature channel. As described above, the image modification of the present disclosure is applicable to the color channels. However, in addition, or alternatively to the color channels, the image modification is applicable to feature channels. Feature channel may be, for instance an image capturing depth, an image (or tensor) capturing optical flow, or any other sample-related image features.

Regarding the image regions, which may correspond to the above-mentioned patches, the image region may be one of the following:
a patch of a predetermined size corresponding to a part of an image or a part of a plurality of images, or
an image or a plurality of images.

In particular, the selection of the image channel may be performed per image. It may be performed per picture which is a frame or a field of a video sequence. It may be performed for a certain number of images (such as a group pf pictures) of a video sequence. The selection of the image channel may be performed per patch or in general per image region. There may be a decision performed at the encoder with which granularity (for which of the above sample amount) the color channel is to be selected. Such decision may then be indicated to the decoder. Alternatively, the encoder and the decoder may perform the determination of channel selection granularity based on other coding parameters known to both the encoder and the decoder.

Depending on the image modification kind, there may be some criteria which are advantageously observed when choosing the patch size (size of the image region which is modified). In particular, there may be some minimum size given by the type of processing applied during the image modification. According to an exemplary implementation, the patch size selection includes choosing a minimum size for the image region based on the number of hidden layers of the neural network. In particular, the minimum size is at least 2*((kernel_size−1)/2*n_layers)+1, wherein kernel_size is the size of the kernel of the neural network which is a convolutional neural network and n_layers are the number of the layers of the neural network. This limitation results from the fact that convolution with a kernel is based on a plurality of values and may produce only one value. For example, when a convolution with a 3×3 kernel is applied to an image portion of a size 5×5, the resulting feature map will have a size of 3×3. When each of the feature points is to be calculated fully based on the input (image) data. Thus, with each layer in which convolution with a kernel 3×3 is applied, the size of the convolved image (feature map) is reduced by 2 in each dimension (vertical and horizontal). It is noted that while padding could be used, the amount of information provided by feature maps obtained from padded inputs would be lower.

In order to enable efficient processing (image modification), in accordance with an embodiment which may be employed in combination with any of the above mentioned embodiments and examples, rearranging the pixels of each of the at least two image channels of the image region into a plurality, S, of sub-regions. Moreover, each of the sub-regions of an image channel among the at least two image channels contains a subset of the samples of said image channel. For all image channels, the horizontal dimensions of sub-regions are the same and equal to an integer multiple mh of the greatest common divisor of the horizontal dimension of the image. For all image channels, the vertical dimensions of sub-regions are the same and equal to integer multiple mv of the greatest common divisor of the vertical dimension of the image. It is noted that "integer" multiple herein may be 1, 2, 3, or more. In other words, the integer multiple may also be one.

Figure 12:
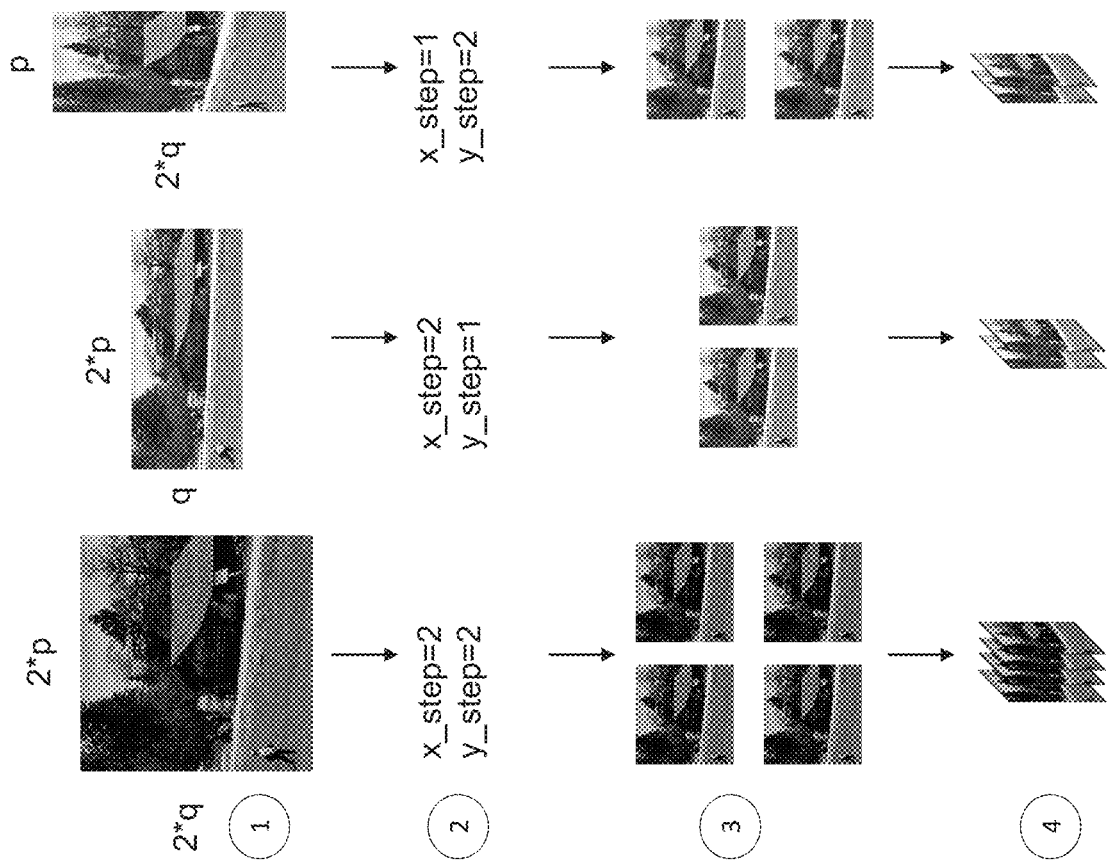
FIG. 12 is a schematic drawing illustrating pixel re-arrangement considering size of the image.

Such selection of the patch size, possibly different for different image channels, is illustrated in FIG. 12. In FIG. 12, the three channels have different sizes. The pixel rearranging block arranges the input pixels into a 3D-array. It can handle multiple channels with different dimensions, provided that the dimensions have a common integer factor. The input are N planar images, where N is the number of the channels (here 3). The output is N 3D-arrays with identical height and width (to be determined), and possibly different depth (i.e. different number of layers in z-direction).

The first step is to find common factors q, p for horizontal and vertical dimensions of each image. Then, horizontal step x_step and vertical step y_step are defined for each channel. The step is the second factor in the factorization of each dimension. The next stage creates m images, where m=x_step*y_step, by using pixels with coordinates {k*x_step+x_offset, k*y_step+y_offset}, where k ∈ Z, x_offset ∈ [0, x_step); y_offset ∈ [0, y_step) for all combinations of offsets. Here, "[" refers to a closed interval, meaning that the boundary number (here 0) belongs to the range. Symbol ")" refers to an open interval, meaning that the boundary number (here x_step, y_step) does not belong to the interval. It is equivalent to write that x_offset=0 . . . x_step−1 and y_offset=0 . . . y_step−1. For one channel, the output of the pixel reordering block is a stack (3D-array) of values with dimensions q×p×m. The number of output stacks is equal to the number of input channels.

In the above-explained arrangement of FIG. 12, the integer multiple is used as the step size to divide samples of each channel into multiple sub-images (sub-sampled images).

After such rearrangement, pixels which were close together will remain close together—x and y distance between some pixels will decrease, z distance will increase. In this way, pixels from a close neighborhood still fit inside one convolution kernel. This is beneficial for the proper operation of the filter (neural network used to modify the image).

In general, in other words, the S sub-regions of the image region are disjoint with S=mh*mv, and have horizontal dimension dimh and vertical dimension dimv. A sub-region includes samples of the image region on the positions {kh*mh+offh, kv*mv+offv}, with kh ∈ [0, dimh−1] and kv ∈ [0, dimv−1]. Each combination of offh and offv specifies the respective sub-region with offk ∈ [1, mh] and offv ∈ [1, mv].

Figure 13:
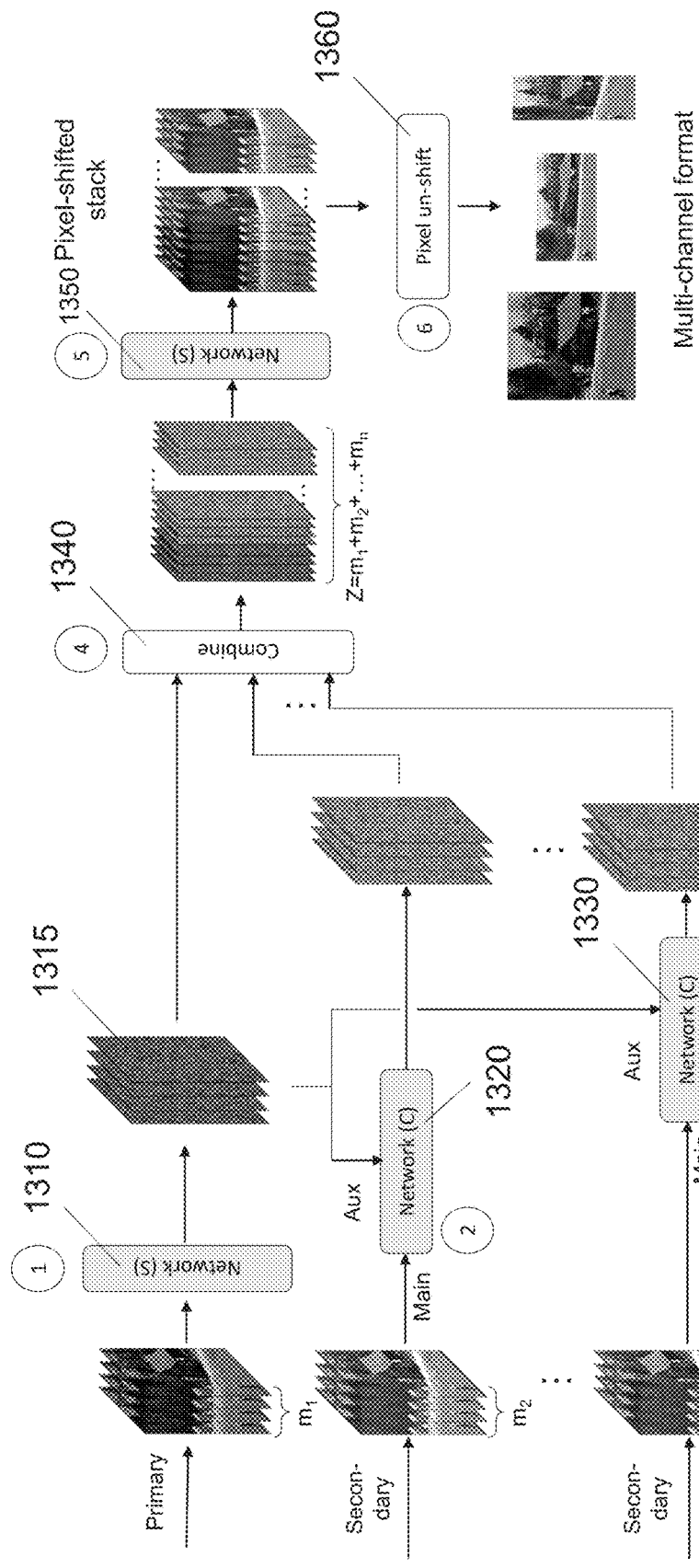
FIG. 13 is a schematic drawing illustrating multi-channel image enhancement supporting n channels having possibly different sizes.

FIG. 13 summarizes possible operation of a multi-channel processing after the channel selection is performed. There are N+1 convolutional neural networks involved in the enhancement filter. Two networks 1310 and 1350, marked as networks (S), out of the four networks 1310, 1320, 1330, 1350 operate in a single-input mode, meaning that they have as an input one image channel. The remaining two networks 1320 and 1330 (marked as networks (C)) operate in dual-input mode, meaning that they have as an input not only one image channel, but in addition also processed primary channel, i.e. the channel which has been processed by the single-input network 1310. The processed primary channel is used as an auxiliary input of all dual-input CNNs, i.e. of all networks which process respective secondary channels. Each secondary channel is processed with such dual-input CNN. In the present example, two image channel are processed by the networks 1320 and 1330. The secondary channel is used as a main input of the network (1320 or 1330). All processed channels are concatenated into a single stack in the module 1340 and are then processed by another single-input CNN 1350. Finally, the pixels are re-arranged 1360 again to match the dimensions and number of channels of the input image, in case rearrangement was been applied at the beginning.

In comparison with the scheme discussed with reference to FIG. 4, in this embodiments, the networks 1310, 1320, 1330, and 1350 of FIG. 13 are adapted to accommodate stacks with different depths (by changing the sizes of the corresponding convolution kernels, in particular by changing the depths of the convolution kernels).

As discussed above, in particular with reference to FIGS. 1 to 3, 5, 8, and 9, the image modification may be applied for image or video coding and decoding. For example, a method for encoding an image or a video sequence or images is provided. The method includes obtaining an original image region, encoding the obtained image region into a bitstream, and applying the method for modifying an image region obtained by reconstructing the encoded image region. The modification may be performed as mentioned above, including selection of the primary image channel.

The method may comprise including into the bitstream an indication of the selected primary channel. This was exemplified in FIG. 9 (filter parameters).

The method in some embodiments may further include obtaining a plurality of image regions (e.g. patches) and applying said method for modifying the obtained image region to the image regions of the obtained plurality of image regions individually. This may be serially in time or in parallel. Moreover, the method included the step of including into the bitstream for each of the plurality of image regions at least one of: (i) an indication indicating that the method for modifying the obtained image region is not to be applied for the image region, (ii) an indication of the selected primary channel for the region. The option (i) may be result of the determination by the classifier of FIG. 1050, namely the (N+1)-th output indicating that the image region should not be processed. However, it may be a result of a determination which may be performed in a different manner or configured by a user or an application.

The above image regions may correspond to the patches described in the detailed examples above. A patch is selected from the reordered 3D-arrays. The patch is taken from the same place in each channel and processed. Each side of the patch should be larger than 2*(P+2), where P is number of the hidden layers in the enhancement filter, as already mentioned above. Provided sufficient memory, all 3D-arrays can be entirely processed in a single pass. The (rearranged) patch size may be 128×128 pixels, or larger in some exemplary implementations. However, the patches may also be smaller, depending on the image resolution, the desired speed of processing, availability of the parallel processing or the like.

The method for encoding the image or the video sequence or images may wherein, when applying the method for modifying the obtained image region, the selection of the primary channel and the secondary channel is performed based on the reconstructed image region without referring to the obtained image region input to the encoding step. This corresponds to the embodiment discussed above with reference to FIG. 8, but not shown in FIG. 8, since FIG. 8 shows a decoder. However, the operation of the encoder and the decoder after reconstruction is similar.

The present disclosure further provides a method for decoding an image or a video sequence or images from a bitstream including step of reconstructing an image region from the bitstream and a step of applying the method according for modifying the image region as described above. This may still be loop filter or post filter, as they both are based on reconstructed image region.

The decoding method may further include parsing the bitstream to obtain at least one of: (i) an indication indicating that the method for modifying the obtained image region is not to be applied for the image region, (ii) an indication of the selected primary channel for the region. The method further includes a step of reconstructing an image region from the bitstream. In a case where the indication indicates a selected primary channel, modifying the reconstructed image region with the indicated primary channel as the selected primary channel. This corresponds to the full-reference embodiments described with reference to FIG. 9.

Moreover an apparatus is provided for modifying an image region represented by two or more image channels, the quantizer device implemented by circuitry configured to perform steps according to any of the methods described above for image modification.

Figure 14:
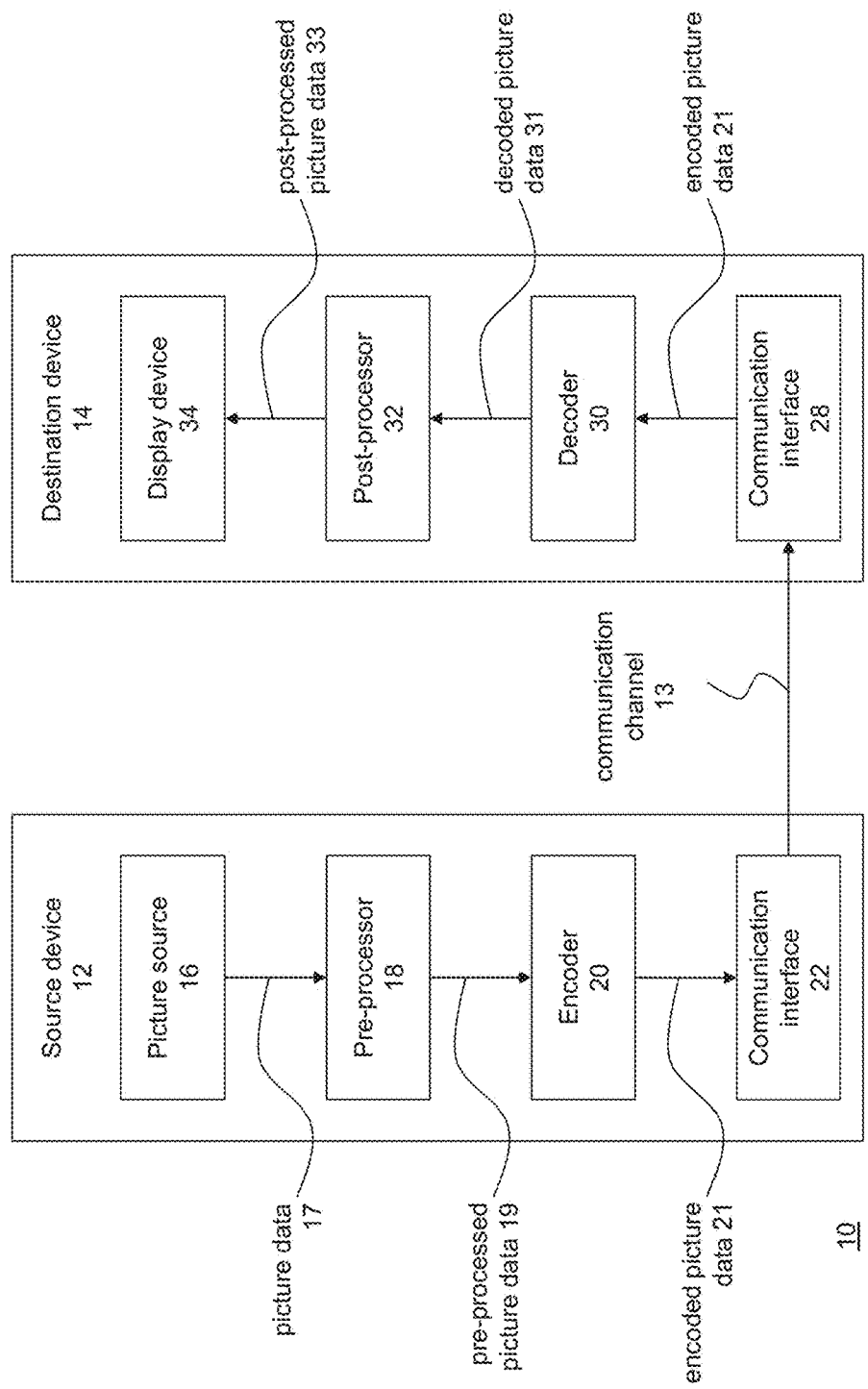
FIG. 14 is a block diagram showing an example of a video coding system configurable to implement some embodiments.

FIG. 14 is a schematic block diagram illustrating an example coding system 10, e.g. a video coding system 10 (or short coding system 10) that may utilize techniques of this present disclosure. Video encoder 20 (or short encoder 20) and video decoder 30 (or short decoder 30) of video coding system 10 represent examples of devices that may be configured to perform techniques in accordance with various examples described in the present application. In particular, the encoder 20 may correspond to the encoder shown in FIG. 1 or in FIG. 5. The decoder 30 may correspond to the decoder shown in FIG. 2, or the like.

For example, an encoder such as the encoder 20 may comprise an input module for obtaining an original image region, a compression module for encoding the obtained image region into a bitstream, a reconstruction module for reconstructing the encoded image region, and an apparatus for modifying the reconstructed image region as described above.

Moreover, a decoder (such as decoder 30) may be provided for decoding an image or a video sequence or images from a bitstream, wherein the decoder comprises: a reconstruction module for reconstructing an image region from the bitstream; and the apparatus for modifying the reconstructed image region.

As shown in FIG. 14, the coding system 10 comprises a source device 12 configured to provide encoded picture data 21 e.g. to a destination device 14 for decoding the encoded picture data 13. The source device 12 comprises an encoder 20, and may additionally, i.e. optionally, comprise a picture source 16, a pre-processor (or pre-processing unit) 18, e.g. a picture pre-processor 18, and a communication interface or communication unit 22. The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17. Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component. The image modification as described in the above embodiments and examples may be applied as image pre-processing.

The video encoder 20 is configured to receive the pre-processed picture data 19 and provide encoded picture data 21. Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction. The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30. The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network. The communication interface 28, forming the counterpart of the communication interface 22, may be, e.g., configured to receive the transmitted data and process the transmission data using any kind of corresponding transmission decoding or processing and/or de-packaging to obtain the encoded picture data 21. Both, communication interface 22 and communication interface 28 may be configured as unidirectional communication interfaces as indicated by the arrow for the communication channel 13 in FIG. 14 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31. The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 14 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof. As will be apparent for the skilled person based on the description, the existence and (exact) split of functionalities of the different units or functionalities within the source device 12 and/or destination device 14 as shown in FIG. 14 may vary depending on the actual device and application.

Figure 15:
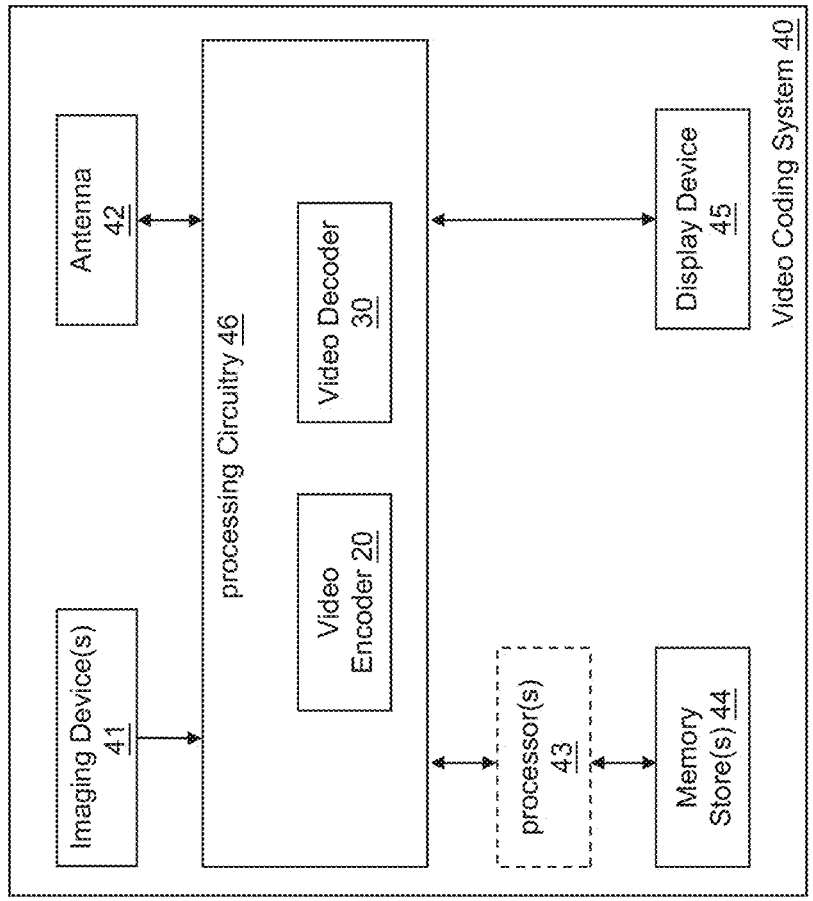
FIG. 15 is a block diagram showing another example of a video coding system configurable to implement some embodiments.
Figure 17:
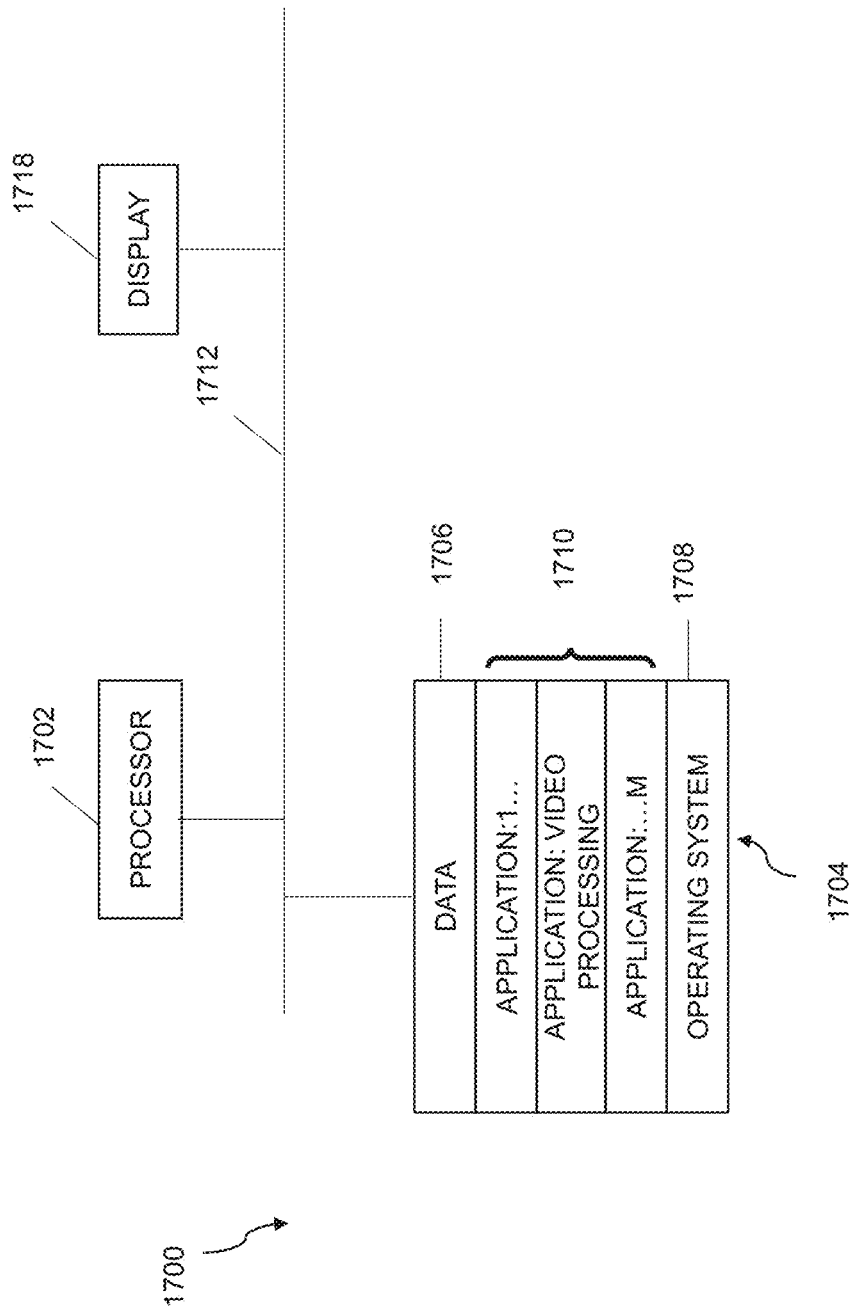
FIG. 17 is a block diagram illustrating another example of an encoding apparatus or a decoding apparatus.

The encoder 20 (e.g. a video encoder 20) or the decoder 30 (e.g. a video decoder 30) or both encoder 20 and decoder 30 may be implemented via processing circuitry as shown in FIG. 15, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 1 and/or any other encoder system or subsystem described herein. The decoder 30 may be implemented via processing circuitry 46 to embody the various modules as discussed with respect to decoder 30 of FIG. 2 and/or any other decoder system or subsystem described herein. The processing circuitry may be configured to perform the various operations as discussed later. As shown in FIG. 17, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 15.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 14 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory. For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Figure 16:
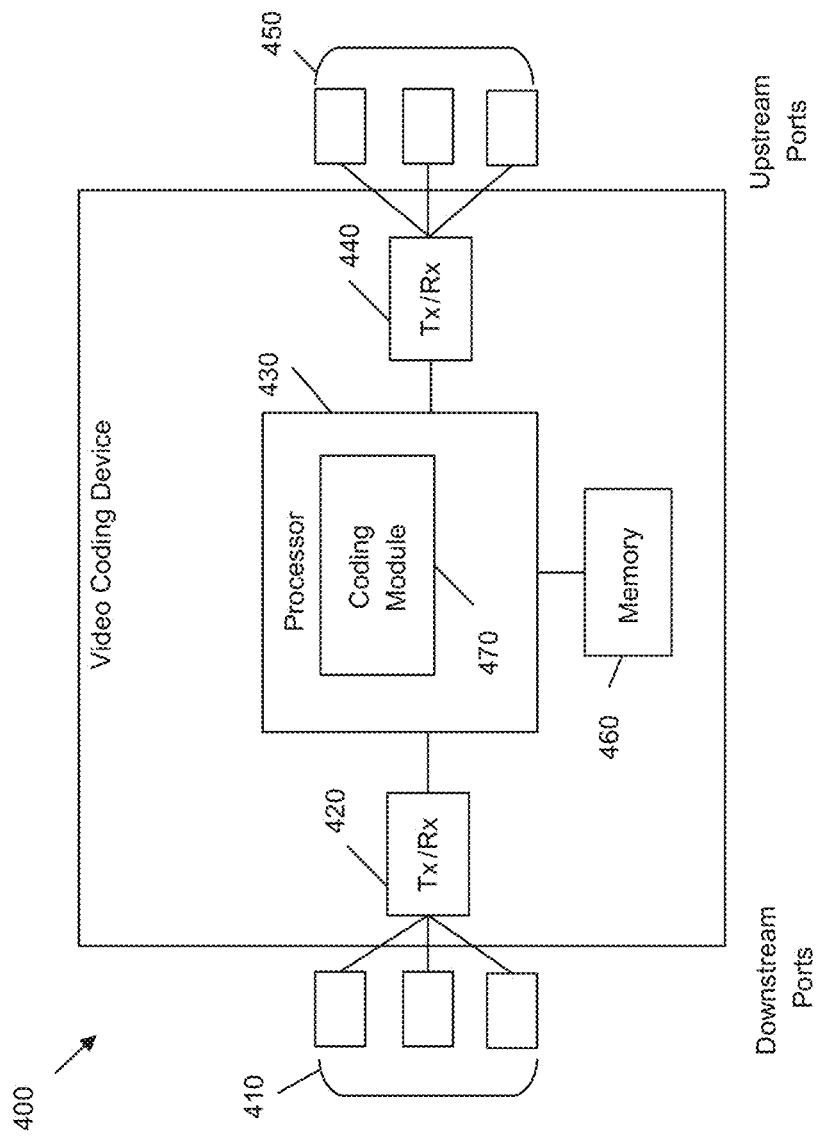
FIG. 16 is a block diagram illustrating an example of an encoding apparatus or a decoding apparatus.

FIG. 16 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 14 or an encoder such as video encoder 20 of FIG. 14. The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

FIG. 17 is a simplified block diagram of an apparatus 1700 that may be used as either or both of the source device 12 and the destination device 14 from FIG. 14 according to an exemplary embodiment. A processor 1702 in the apparatus 1700 can be a central processing unit. Alternatively, the processor 1702 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 1704 in the apparatus 1700 can be a read only memory (ROM) device or a random access memory (RAM) device in an implementation. Any other suitable type of storage device can be used as the memory 1704. The memory 1704 can include code and data 1706 that is accessed by the processor 1702 using a bus 1712. The memory 1704 can further include an operating system 1708 and application programs 1710, the application programs 1710 including at least one program that permits the processor 1702 to perform the methods described here. For example, the application programs 1710 can include applications 1 through N, which further include a video coding application that performs the methods described here. In particular, a computer program product may be provided which comprises a program code stored on a non-transitory medium, wherein the program, when executed on one or more processors, performs the method for image modification as described above.

The apparatus 1700 can also include one or more output devices, such as a display 1718. The display 1718 may be, in one example, a touch sensitive display that combines a display with a touch sensitive element that is operable to sense touch inputs. The display 1718 can be coupled to the processor 1702 via the bus 1712. Although depicted here as a single bus, the bus 1712 of the apparatus 1700 can be composed of multiple buses. Further, the secondary storage 1714 can be directly coupled to the other components of the apparatus 1700 or can be accessed via a network and can comprise a single integrated unit such as a memory card or multiple units such as multiple memory cards. The apparatus 1700 can thus be implemented in a wide variety of configurations.

Summarizing, the present disclosure relates to image modification such as an image enhancement. The image enhancement may be applied for any image modification and it may be applied during or after image encoding and/or decoding, e.g. as a loop filter or a post filter. In particular, the image modification includes a multi-channel processing in which a primary channel is processed separately and secondary channels are processed based on the processed primary channel. The processing is based on a neural network. In order to enhance the image modification performance, prior to applying the modification, the image channels are analyzed and a primary channel and the secondary channels are determined, which may vary for multiples of images, images or image areas.

What is claimed is:

1. A method for modifying an image region represented by two or more image channels, the method comprising:
   selecting one of the two or more image channels as a primary channel and another at least one of the two or more image channels as a secondary channel;
   processing the primary channel with a first neural network to obtain a modified primary channel;
   processing the secondary channel with a second neural network to obtain a modified secondary channel, wherein the processing with the second neural network is based on the modified primary channel;
   obtaining a modified image region based on the modified primary channel and the modified secondary channel; and
   rearranging pixels of each of the at least two image channels of the image region into a plurality, S, of sub-regions wherein:
      each of the sub-regions of an image channel among the at least two image channels contains a subset of samples of the image channel,
      for all image channels, the horizontal dimensions of the sub-regions are the same and equal to an integer multiple mh of the greatest common divisor of the horizontal dimension of the image across all image channels, and
      for all image channels, the vertical dimensions of the sub-regions are the same and equal to an integer multiple my of the greatest common divisor of the vertical dimension of the image across all image channels.

2. The method according to claim 1, wherein the step of selecting the primary channel and the secondary channel among the two or more image channels is performed based on an output of a classifier based on a neural network, to which the two or more image channels are inputted.

3. The method according to claim 1, wherein the two or more image channels include a color channel or a feature channel.

4. The method according to claim 1, wherein the image region is one of the following:
   a patch of a predetermined size corresponding to a part of an image or a part of a plurality of images, or
   an image or a plurality of images.

5. The method according to claim 1, comprising choosing a minimum size for the image region based on the number of hidden layers of each of the first neural network and the second neural network, wherein the minimum size is the smaller of at least $2*((kernel\_size-1)/2*n\_layers)+1$ for each of the respective first or second neural network, with kernel_size being the size of the kernel of the respective neural network which is a convolutional neural network and n_layers being the number of the layers of the respective neural network.

6. The method according to claim 1, wherein
   the S sub-regions of the image region are disjoint with $S=mh*mv$, and have horizontal dimension dimh and vertical dimension dimv, and
   a sub-region includes samples of the image region on the positions $\{kh*mh+offh, kv*mv+offv\}$, with $kh \in [0, dimh-1]$ and $kv \in [0, dimv-1]$, wherein
   each combination of offh and offv specifies the respective sub-region with $offk \in [1, mh]$ and $offv \in [1, mv]$.

7. A method for encoding an image or a video sequence of images, comprising:
   obtaining an original image region;
   encoding the obtained image region into a bitstream, wherein the encoded image region is represented by two or more image channels; and
   modifying an image region obtained by reconstructing the encoded image region by performing the following steps:
   selecting one of the two or more image channels as a primary channel and another at least one of the two or more image channels as a secondary channel;
   processing the primary channel with a first neural network to obtain a modified primary channel;
   processing the secondary channel with a second neural network to obtain a modified secondary channel, wherein the processing with the second neural network is based on the modified primary channel;
   obtaining a modified image region based on the modified primary channel and the modified secondary channel; and
   rearranging pixels of each of the at least two image channels of the image region into a plurality, S, of sub-regions wherein:
   each of the sub-regions of an image channel among the at least two image channels contains a subset of samples of the image channel,
   for all image channels, the horizontal dimensions of the sub-regions are the same and equal to an integer multiple mh of the greatest common divisor of the horizontal dimension of the image across all image channels, and
   for all image channels, the vertical dimensions of the sub-regions are the same and equal to an integer multiple my of the greatest common divisor of the vertical dimension of the image across all image channels.

8. The method for encoding an image or a video sequence of images according to claim 7, comprising a step of including into the bitstream an indication of the selected primary channel.

9. The method for encoding an image or a video sequence of images according to claim 7 comprising:
   obtaining a plurality of image regions;
   applying the method for modifying the obtained image region to the image regions of the obtained plurality of image regions individually; and
   including into the bitstream for each of the plurality of image regions at least one of:
   an indication indicating that the method for modifying the obtained image region is not to be applied for the image region, or
   an indication of the selected primary channel for the image region.

10. The method for encoding an image or a video sequence of images according to claim 7, wherein, the selection of the primary channel and the secondary channel is performed based on the reconstructed image region without referring to the obtained image region input to the encoding step.

11. The method for encoding an image or a video sequence of images according to claim 7, wherein the two or more image channels include a color channel or a feature channel.

12. The method for encoding an image or a video sequence of images according to claim 7, further comprising: choosing a minimum size for the image region based on the number of hidden layers of each of the first neural network and the second neural network, wherein the minimum size is the smaller of at least $2*((kernel\_size-1)/2*n\_layers)+1$ for each of the respective first or second neural network, with kernel_size being the size of the kernel of the respective neural network which is a convolutional neural network and n_layers being the number of the layers of the respective neural network.

13. An apparatus for modifying an image region represented by two or more image channels, wherein the apparatus comprising:
   at least one processor; and
   at least one memory coupled to the at least one processor and storing instructions for execution by the at least one processor to cause the at least one processor to perform the following steps:
   selecting one of the two or more image channels as a primary channel and another at least one of the two or more image channels as a secondary channel;
   processing the primary channel with a first neural network to obtain a modified primary channel;
   processing the secondary channel with a second neural network to obtain a modified secondary channel, wherein the processing with the second neural network is based on the modified primary channel;
   obtaining a modified image region based on the modified primary channel and the modified secondary channel; and
   rearranging pixels of each of the at least two image channels of the image region into a plurality, S, of sub-regions wherein:

each of the sub-regions of an image channel among the at least two image channels contains a subset of samples of the image channel, for all image channels, the horizontal dimensions of the sub-regions are the same and equal to an integer multiple mh of the greatest common divisor of the horizontal dimension of the image across all image channels, and for all image channels, the vertical dimensions of the sub-regions are the same and equal to an integer multiple my of the greatest common divisor of the vertical dimension of the image across all image channels.

14. The apparatus according to claim 13, wherein the at least one processor is further configured to:
select the primary channel and the secondary channel among the two or more image channels based on an output of a classifier based on a neural network, to which the two or more image channels are inputted.

15. The apparatus according to claim 13, wherein the two or more image channels include a color channel or a feature channel.

16. The apparatus according to claim 13, wherein the at least one processor is further configured to:
choose a minimum size for the image region based on the number of hidden layers of each of the first neural network and the second neural network, wherein the minimum size is the smaller of at least 2*((kernel size−1)/2*n_layers)+1 for each of the respective first or second neural network, with kernel_size being the size of the kernel of the respective neural network which is a convolutional neural network and n layers being the number of the layers of the respective neural network.

17. The apparatus according to claim 13, wherein the at least one processor is further configured to perform the following steps:
obtaining an original image region;
encoding the obtained image region into a bitstream;
reconstructing the encoded image region, and modifying the reconstructed image region; or
reconstructing an image region from a bitstream, and modifying the reconstructed image region.

\* \* \* \* \*

UNITED STATES PATENT AND TRADEMARK OFFICE
CERTIFICATE OF CORRECTION

| | |
|---|---|
| PATENT NO. | : 12,047,613 B2 |
| APPLICATION NO. | : 18/064745 |
| DATED | : July 23, 2024 |
| INVENTOR(S) | : Cui et al. |

It is certified that error appears in the above-identified patent and that said Letters Patent is hereby corrected as shown below:

On the Title Page

Page 2: (56) References Cited, Other Publications, In Column 1, NPL Citation #1, Line 2: reads as "Inter-channel Correlation in a 3-stage CNN: Submission to the CUC" should read as -- Inter-channel Correlation in a 3-stage CNN: Submission to the CLIC --.

Page 2: (56) References Cited, Other Publications, In Column 1, NPL Citation #1, Line 5: reads as "Total 4 pages (Jun. 2018)." should read as -- Total 5 pages (Jun. 2018). --.

In the Claims

Claim 1: Column 34, Line 65: reads as "multiple my of the greatest common divisor of the" should read as -- multiple mv of the greatest common divisor of the --.

Claim 4: Column 35, Line 11: reads as "a patch of a predetermined size corresponding to a part of" should read as -- • a patch of a predetermined size corresponding to a part of --.

Claim 4: Column 35, Line 13: reads as "an image or a plurality of images." should read as -- • an image or a plurality of images. --.

Claim 7: Column 36, Line 1: reads as "multiple my of the greatest common divisor of the" should read as -- multiple mv of the greatest common divisor of the --.

Claim 9: Column 36, Line 16: reads as "an indication indicating that the method for modifying the" should read as -- • an indication indicating that the method for modifying the --.

Claim 9: Column 36, Line 19: reads as "an indication of the selected primary channel for the" should read as -- • an indication of the selected primary channel for the --.

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 12,047,613 B2

Claim 13: Column 37, Line 11: reads as "multiple my of the greatest common divisor of the" should read as -- multiple mv of the greatest common divisor of the --.

Claim 16: Column 38, Lines 6-7: read as "minimum size is the smaller of at least 2 * ((kernel size-1)/2 * n_layers) + 1 for each of the respective first or" should read as -- minimum size is the smaller of at least 2 * ((kernel_size-1)/2 * n_layers) + 1 for each of the respective first or --.

Claim 16: Column 38, Line 10: reads as "a convolutional neutral network and n layers being the" should read -- a convolutional neutral network and n_layers being the --.